United States Patent
Takahashi et al.

(10) Patent No.: US 7,050,379 B2
(45) Date of Patent: May 23, 2006

(54) OPTICAL PICKUP-USE OBJECT LENS, OPTICAL PICKUP AND OPTICAL DISK UNIT

(75) Inventors: Toyokazu Takahashi, Kanagawa (JP); Satoshi Hineno, Kanagawa (JP)

(73) Assignee: Sony Corporation (JP)

( * ) Notice: Subject to any disclaimer, the term of this patent is extended or adjusted under 35 U.S.C. 154(b) by 152 days.

(21) Appl. No.: 10/466,636

(22) PCT Filed: Feb. 28, 2002

(86) PCT No.: PCT/JP02/01866

§ 371 (c)(1),
(2), (4) Date: Feb. 3, 2004

(87) PCT Pub. No.: WO02/069014

PCT Pub. Date: Sep. 6, 2002

(65) Prior Publication Data

US 2004/0114245 A1      Jun. 17, 2004

(30) Foreign Application Priority Data

Feb. 28, 2001 (JP) .............................. 2001-054219
Jul. 9, 2001 (JP) .............................. 2001-208194

(51) Int. Cl.
  *G11B 7/00* (2006.01)
(52) U.S. Cl. .............................. 369/112.08; 369/112.26
(58) Field of Classification Search ........... 369/112.08, 369/112.26, 112.24; 359/719
See application file for complete search history.

(56) References Cited

U.S. PATENT DOCUMENTS 5,629,799 A      5/1997 Maruyama et al.
6,829,105 B1 *   12/2004 Kubo .......................... 359/719
2002/0012313 A1 *  1/2002 Kimura et al. ......... 369/112.08
2002/0067551 A1 *  6/2002 Ohtake ....................... 359/687

FOREIGN PATENT DOCUMENTS

| JP | 63-4213 A1 | 1/1988 |
| JP | 4-97110 A1 | 3/1992 |
| JP | 6-250081 A1 | 9/1994 |
| JP | 9-108174 A1 | 4/1997 |
| JP | 2001-21783 A1 | 1/2001 |
| JP | 2001-296472 A1 | 10/2001 |

OTHER PUBLICATIONS

International Preliminary Examination Report Apr. 30, 2003.
International Search Report Jun. 4, 2002.

* cited by examiner

*Primary Examiner*—Hoa T. Nguyen
*Assistant Examiner*—Van T. Pham
(74) *Attorney, Agent, or Firm*—Rader, Fishman & Grauer PLLC; Ronald P. Kananen

(57) ABSTRACT

The present invention is relative to an objective lens (15) for an optical pickup, having a numerical aperture not less than 0.8, and adapted for correcting the chromatic aberration at an image point on an optical axis for light with a wavelength within several nm about a reference wavelength which is not larger than 420 nm. This objective lens is made up by a first lens set GR1, having a compound surface $S_2$ of a refractive surface $S_{2r}$ and a diffractive surface $S_{2d}$, and a second lens set GR2, having a positive refractive power, looking from the light source side. The compound surface of the first lens set is formed by adding the diffractive surface having the positive refractive power to the refractive surface which is an aspherical surface having the negative refractive power. The lens forming the second lens set is a single lens including at least one aspherical lens. This objective lens is small-sized, permits effective correction of chromatic aberration and enables the laser light to be converged to close to the diffraction threshold.

27 Claims, 24 Drawing Sheets

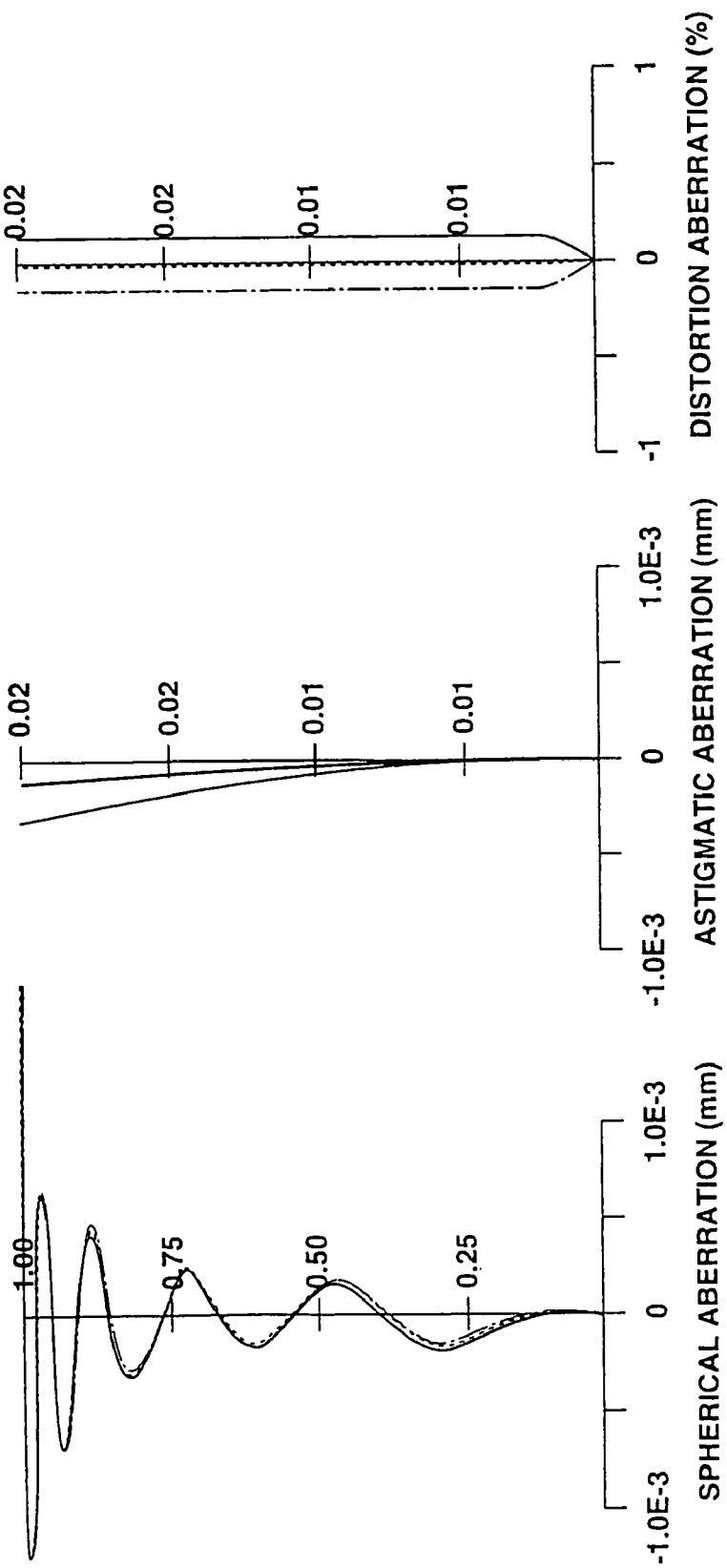

OPTICAL PICKUP-USE OBJECT LENS, OPTICAL PICKUP AND OPTICAL DISK UNIT

TECHNICAL FIELD

This invention relates to an objective lens used in illuminating a light beam, such as a laser light beam, for recording the information and for reproducing the information recorded on the optical recording medium, an optical pickup device employing this objective lens, and to an optical disc device. More particularly, it relates to an objective lens capable of converging a light beam to a diffraction limit on a recording surface of an optical recording medium, to an optical pickup device employing this objective lens, and to an optical disc device.

BACKGROUND ART

As an information recording medium, a non-contact type optical recording medium, having a high recording density, is now in use. The information is recorded on the optical recording medium by illuminating a light beam, such as a laser light beam, on the recording surface, while the information recorded on the optical recording medium may be reproduced in similar manner. As this sort of the optical recording medium, a recording medium formed an optical disc, that is a disc-shaped optical recording medium, is finding widespread use because of ease in retrieving the recorded information.

An optical disc has a spirally or concentrically formed recording track(s). The distance between center lines of neighboring recording track turns, that is the track pitch, is approximately 1.6 µm in the case of for example a CD (Compact Disc), while being smaller and 0.74 µm in the case of a DVD (Digital Versatile Disc), for thereby improving the information recording density appreciably.

For illuminating the laser light on an optical disc where the track pitch on the recording tracks of a DVD, etc. is decreased to improve the information recording density, a beam spot smaller than in the case of an optical disc with a larger track pitch needs to be formed on the recording surface of the optical disc.

The diameter of the beam spot of the laser light beam, converged by the objective lens, is proportionate to the design wavelength of the laser light, while being inversely proportionate to the numerical aperture (NA) of the objective lens. Thus, for reducing the beam spot diameter, it is necessary to increase the numerical aperture of the objective lens and to decrease the laser light wavelength.

For recording the information on an optical disc by a phase change method, or still other methods, the laser light of high light energy is required. On the other hand, the laser light noise due to reflected laser light needs to be reduced. For this reason, the driving power is varied by such methods as by superposing high frequency on the driving current or voltage of the semiconductor laser to vary the wavelength of the laser light in a shorter period. Consequently, in an optical pickup designed for illuminating a coherent laser light beam on the optical disc, chromatic aberration ascribable to wavelength variations of several nm tends to be produced, thus increasing the size of the beam spot on the optical disc.

An optical pickup includes an objective lens for converging a laser light beam 200 on the recording surface of an optical disc. A state-of-the-art objective lens 201, shown in FIG. 1, is formed by a sole lens, obtained on glass molding, and has an aspherical surface 201*a* of high light converging performance.

As may be seen from the graphs of the spherical aberration of FIG. 2A, astigmatic aberration of FIG. 2B and the distortion aberration of FIG. 2C, the chromatic aberration of the order of ±0.6 µm/nm is generated with this objective lens 201 for the wavelength variation of the order of ±0.2 nm, even with the use of an aspherical surface 201*a*. It should be noted that, in the aberration diagrams of FIGS. 2A to 2C, solid lines, broken lines and chain-dotted lines indicate the values of the aberration at 405 nm, 403 nm and 407 nm, respectively, and that, in FIG. 2B, showing astigmatic aberration, thick lines and fine lines indicate values in a sagittal image surface and in a tangential image surface, respectively.

For recording the information on an optical disc, in which high recording density is achieved by narrowing the track pitch of the recording medium, it is desirable to converge the laser light to close to the diffraction threshold by an objective lens to form a smaller beam spot. However, with the state-of-the-art monolithic objective lens 201, obtained on molding the glass having the aspherical surface 201*a*, it is difficult to converge the laser light to close to the diffraction threshold, because of generation of the chromatic aberration, as described above.

DISCLOSURE OF THE INVENTION

The present invention has been proposed in view of the state of the art, described above, and aims to provide a novel objective lens usable with advantage for an optical pickup used for recording and/or reproducing the information for an optical recording medium in which the track pitch of the recording track is narrowed to increase the recording density. The present invention also aims to provide a small-sized objective lens which is able to compensate for chromatic aberration effectively and to converge the light beam to close to a diffraction threshold.

Moreover, the present invention aims to provide an optical pickup employing an objective lens capable of effectively correcting the chromatic aberration and of converging the light beam to close to a diffraction threshold, and an optical disc employing this optical pickup.

For accomplishing the above objects, the present invention provides an objective lens for an optical pickup, having a numerical aperture not less than 0.8, and adapted for correcting the chromatic aberration at an image point on an optical axis for light with a wavelength within several nm about a reference wavelength which is not larger than 420 nm, wherein the first lens set includes a compound surface constituted by adding a diffractive surface having a positive refractive power to an aspherical refractive surface having a positive refractive power, an amount of sag of the aspherical surface of the first lens set having a negative refractive power is described by a polynominal of an even order number with respect to a radius, as the cone coefficient of the aspherical coefficient (k) is set to 1, an amount of sag of the diffractive surface of the first lens set is described by a polynominal of an even order number with respect to a radius, the order number of the polynominal of the aspherical surface is equal to the order number of the polynominal of the diffractive surface, and the coefficients of the same order numbers of the polynominal of the sag of the aspherical surface are equated to those of the polynominal of the sag of the diffractive surface in such a manner as to meet the equations:

k=1

$C_1 = (N-1)c/2$ $C_2 = (N-1)A$ $C_3 = (N-1)B$ $C_4 = (N-1)C$ $C_5 = (N-1)D$ where $C_1$, $C_2$, $C_3$, $C_4$, $C_5$ ... are coefficients of respective order numbers of the polynominal of the aspherical surface, c/2 is the second order coefficient of the polynominal of the diffractive surface and A, B, C, D, are coefficients of the respective orders of the polynominal of the diffractive surface, with the lens forming the second lens set being formed by a single lens including at least one aspherical surface.

This objective lens effectively corrects the chromatic aberration for a wavelength range of several nm centered about a reference wavelength of 420 nm to enable the light beam spot diameter to be wine-pressed to close to the diffraction threshold. In an optical pickup employing this objective lens, and with an optical disc device, employing this optical pickup, it is possible to record the information to a high density on an optical recording medium in which the track pitch of the recording tracks is narrowed to allow for high density information recording, while it is also possible to reproduce the information correctly from the recording medium in which the information has been recorded to a high density.

With the objective lens of the present invention, in which the aspherical coefficients of the diffractive surface of the first lens set and the aspherical coefficients of the aspherical refractive surface, with the negative refractive power, to which is added the diffractive surface, cancel each other at the same order numbers, the diffractive surface can be formed to a staircase-like cross-sectional shape, in which it is possible to eliminate e.g., non-machinable portions which tend to deteriorate the diffraction efficiency or undulating irregularities which tend to deteriorate the transmittance in molding the diffractive surface during molding of the diffractive surface.

Since the first lens set of the objective lens has the diffractive surface the cross-sectional shape of which is the staircase shape having step differences which will give the phase differences equal to integer number multiples of the design wavelength, it is possible to eliminate, in molding the diffractive surface, e.g., non-machinable portions which tend to deteriorate the diffraction efficiency or saw-tooth like undulations which tend to deteriorate the transmittance.

By employing the objective lens, including the first and second lens sets, the component lenses of which are arranged in a common lens barrel, for an optical pickup, it is possible to improve the working performance in assembling the optical pickup.

With the objective lens of the present invention, in which the first lens set has its surface closest to the light source side, as a planar surface, and has a zero refractive power with respect to the design wavelength, the first lens set can be used only for correcting the chromatic aberration, while the second lens set can be used only for converging the laser light, thus assuring facilitated designing of the respective lens sets.

Since the lenses forming the first lens set is formed of synthetic resin, the objective lens in its entirety can be reduced in weight to reduce the production costs.

Since a protective cover, 0.3 mm or less in thickness, is provided between the second lens set and the image surface, and the spherical aberration chargeable to the protective cover is corrected, it is possible to eliminate the effect ascribable to the spherical aberration produced by the protective cover.

Since the lenses forming the first lens set and the lens barrel are formed as one from synthetic resin, it becomes possible to reduce the number of component parts and the weight of the objective lens itself as well as to diminish the production error in lens assembling, so that it becomes possible to reduce the weight of the objective lens to stabilize its performance as well as to reduce the cost.

Moreover, since the aperture provided between the first and second lens sets is formed by a thin film of e.g., metal, provided on the surface towards the light source side of the refractive type lens forming the second lens set, it becomes possible to suppress the production error in assembling the lens to stabilize its performance.

Additionally, since the concentric irregularities finer than irregularities of the diffractive surface are formed on the compound surface of the first lens set, the concentric irregularities being of a periodic structure having a period equal to about one fourth the reference wavelength and having an amplitude equal to approximately one half the reference wavelength, it becomes possible to elevate the transmittance of light of a constant wavelength incident on the objective lens.

Other objects, features and advantages of the present invention will become more apparent from reading the embodiments of the present invention as shown in the drawings.

BRIEF DESCRIPTION OF THE DRAWINGS

FIG. 29A shows a graph showing spherical aberration of the fifth embodiment of the objective lens, FIG. 29B is a graph showing astigmatic aberration thereof and FIG. 29C is a graph showing distortion aberration thereof.

BEST MODE FOR CARRYING OUT THE INVENTION

Figure 1:
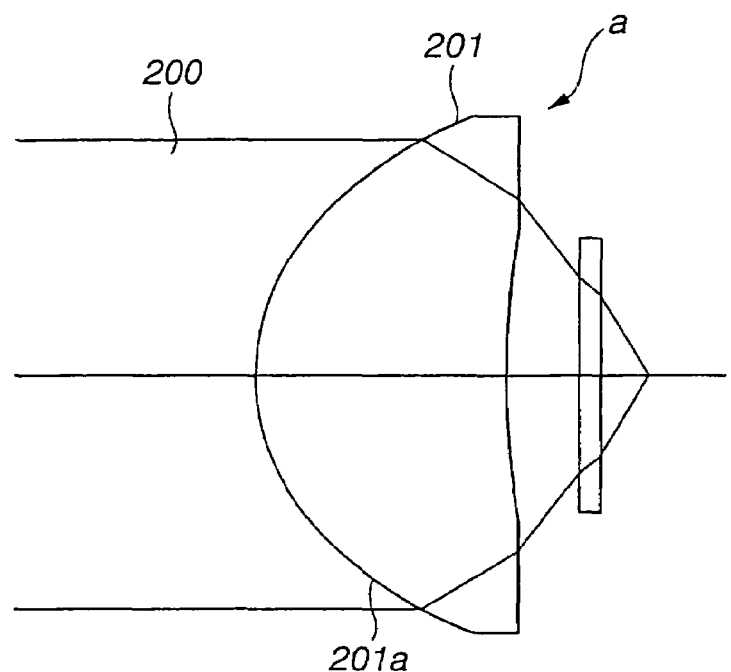
FIG. 1 is a side view showing an objective lens used in a state-of-the-art optical pickup.
Figure 2:
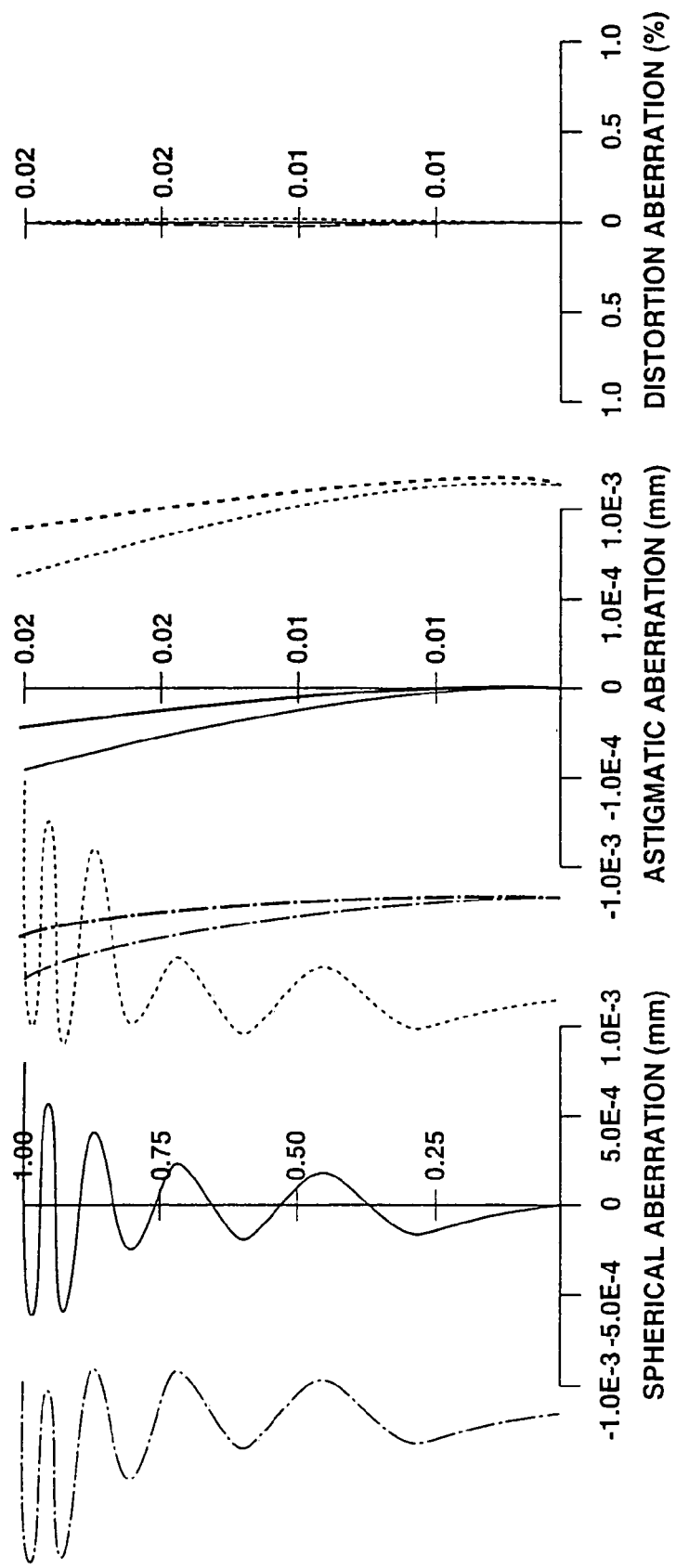
FIG. 2A is a graph showing the spherical aberration of the objective lens shown in FIG. 1.
FIG. 2B is a graph showing its astigmatic aberration and FIG. 2C is a graph showing its distortion aberration.

Referring to the drawings, an objective lens used in an optical pickup device, an optical pickup device employing this objective lens and the optical disc device, according to the present invention, are hereinafter explained in detail.

In the following embodiments, the present invention is applied to an optical disc device for recording and/or reproducing the information on or from a disc-shaped recording medium having a track pitch on the order of 0.06 μm which is narrower than the track pitch of the recording medium provided in a CD (Compact Disc) as a disc-shaped recording medium, for example, a DVD (Digital Video Disc/Digital Versatile Disc), that is a disc-shaped recording medium having the track pitch of the recording track narrowed to elevate the information recording density.

First, an optical disc device, employing an optical pickup, employing in turn an objective lens according to the present invention, is explained.

The optical disc device 1 according to the present invention is such a disc device in which recording signals recorded with an elevated rpm can be read and written at an elevated speed, and employs an optical recording medium having the track pitch narrowed significantly to elevate the recording density, such as DVD (Digital Video/Versatile Disc). The optical disc device 1 according to the present invention is used as an external storage device for an information processing device, such as a personal computer.

Figure 3:
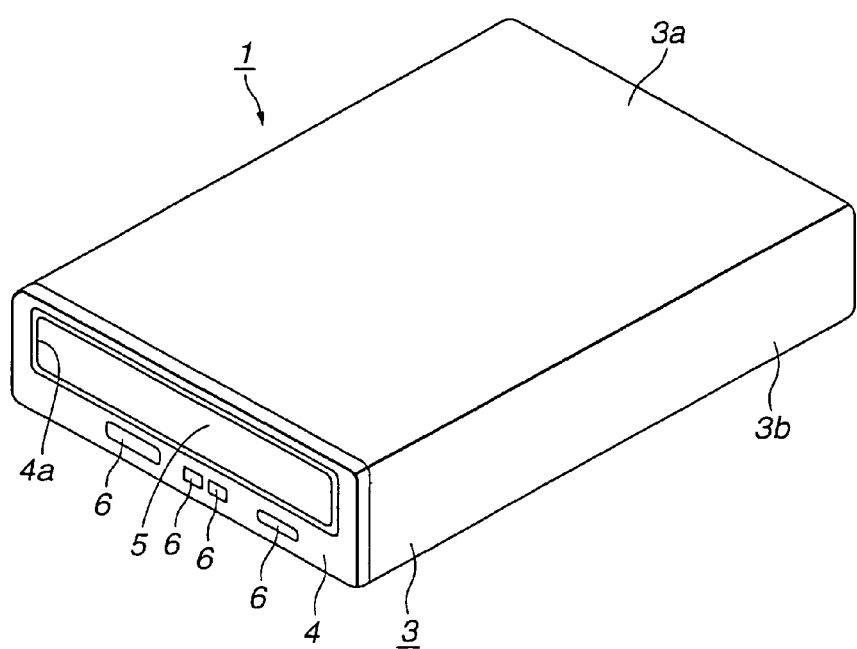
FIG. 3 is a schematic perspective view showing the appearance of an optical disc device to which the present invention is applied.
Figure 4:
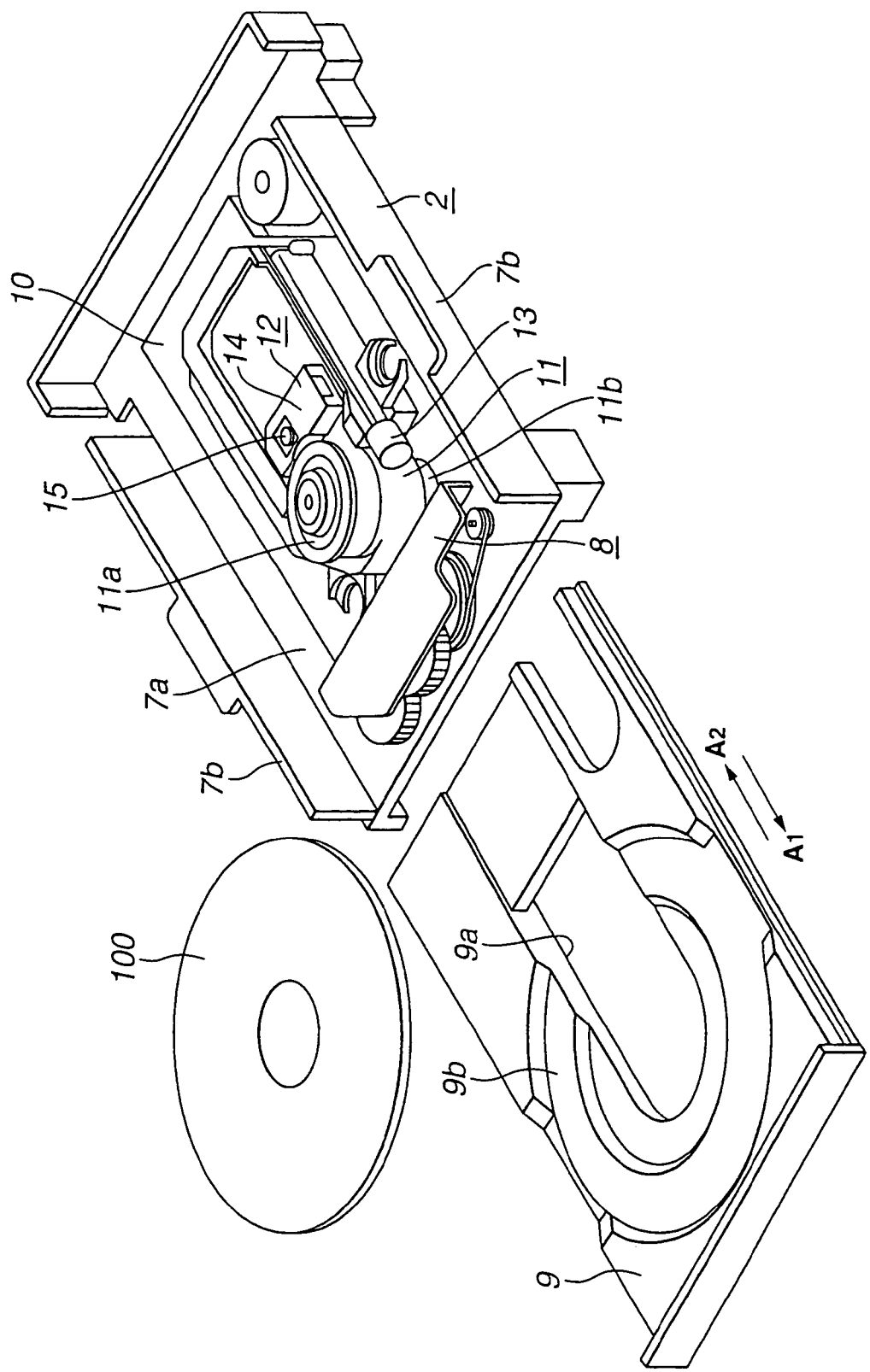
FIG. 4 is an exploded perspective view showing an inner structure of the optical pickup device.

Referring to FIGS. 3 and 4, the disc driving device 1 includes a mechanical frame 2, having various mechanical units arranged thereon. The upper, left, right, forward and rear portions of the mechanical frame 2 are covered by a cover member 3 and a front panel 4, which are secured to the mechanical frame 2 by suitable fastening means, such as set screws.

The cover member 3 is made up integrally by a an upper plate portion 3*a*, lateral surface portions 3*b*, 3*b*, depending from both side edges of the upper plate portion 3*a*, and a rear plate portion, not shown. The front panel 4 has a transverse elongated opening 4*a*. A door 5 for opening/closing the opening 4*a* is rotatably supported by the front panel 4 with the upper end of the door as a fulcrum. The front panel 4 is provided with plural operating buttons 6 for performing various operations.

The mechanical frame 2 includes a mechanical unit mounting surface portion 7*a*, and lateral portions 7*b*, 7*b*, upstanding from both lateral sides of the mechanical unit mounting surface portion 7*a*. On the front side end of the mechanical unit mounting surface portion 7*a* is arranged a loading unit 8 including, for example, cam plates or gears.

A disc tray 9 is carried on the mechanical frame 2 for movement in the fore-and-aft direction, that is in the direction indicated by arrows A1 and A2 in FIG. 4. The disc tray 9 includes a transversely elongated insertion opening 9*a* and a disc setting recess 9*b* in which to set a disc-shaped recording medium 100, which is sometimes referred to below simply as an optical disc. When the optical disc 100 is set on the disc setting recess 9*b*, the disc tray 9 is moved by the loading unit 8 so as to be protruded through the opening 4*a* of the front panel 4 to outside the main body unit of the device. When the information is recorded or reproduced from the optical disc 100, the optical disc 100 is intruded into the inside of the main body unit of the device as the optical disc 100 is set on the disc setting recess 9b.

On the mechanical unit mounting surface portion 7a, a movable frame 10 is supported for rotation, with the rear end thereof as a rotational fulcrum point, as shown in FIG. 4.

The movable frame 10 is provided with a motor unit 11 for causing rotation of the optical disc 100. The motor unit 11 includes a disc table 11a and a driving motor 11b. On the movable frame 10 is carried an optical pickup 12 so that the optical pickup is movable by a guide shaft and a lead screw, not shown, along a radial direction of the optical disc 100 loaded on the disc table 11a.

On the movable frame 10 is mounted a feed motor 13 adapted for rotating the lead screw. Consequently, when the lead screw is rotated by the feed motor 13, the optical pickup 12 is moved in the direction corresponding to the direction of rotation as the optical pickup is guided by the guide shaft.

In the disc driving device 1 of the present invention, when the optical disc 100 set on the disc setting recess 9b of the disc tray 9 is intruded into the inside of the device, held by suitable means on the disc table 11a and is run in rotation along with the disc table 11a by the operation of the driving motor 11b of the motor unit 11, the information is recorded on or reproduced from the optical disc 100, as the optical pickup 12 is moved along the radius of the optical disc 100.

The structure of the optical pickup 12, adapted for recording or reproducing the information on or from the optical disc 100, is now explained in detail.

Figure 5:
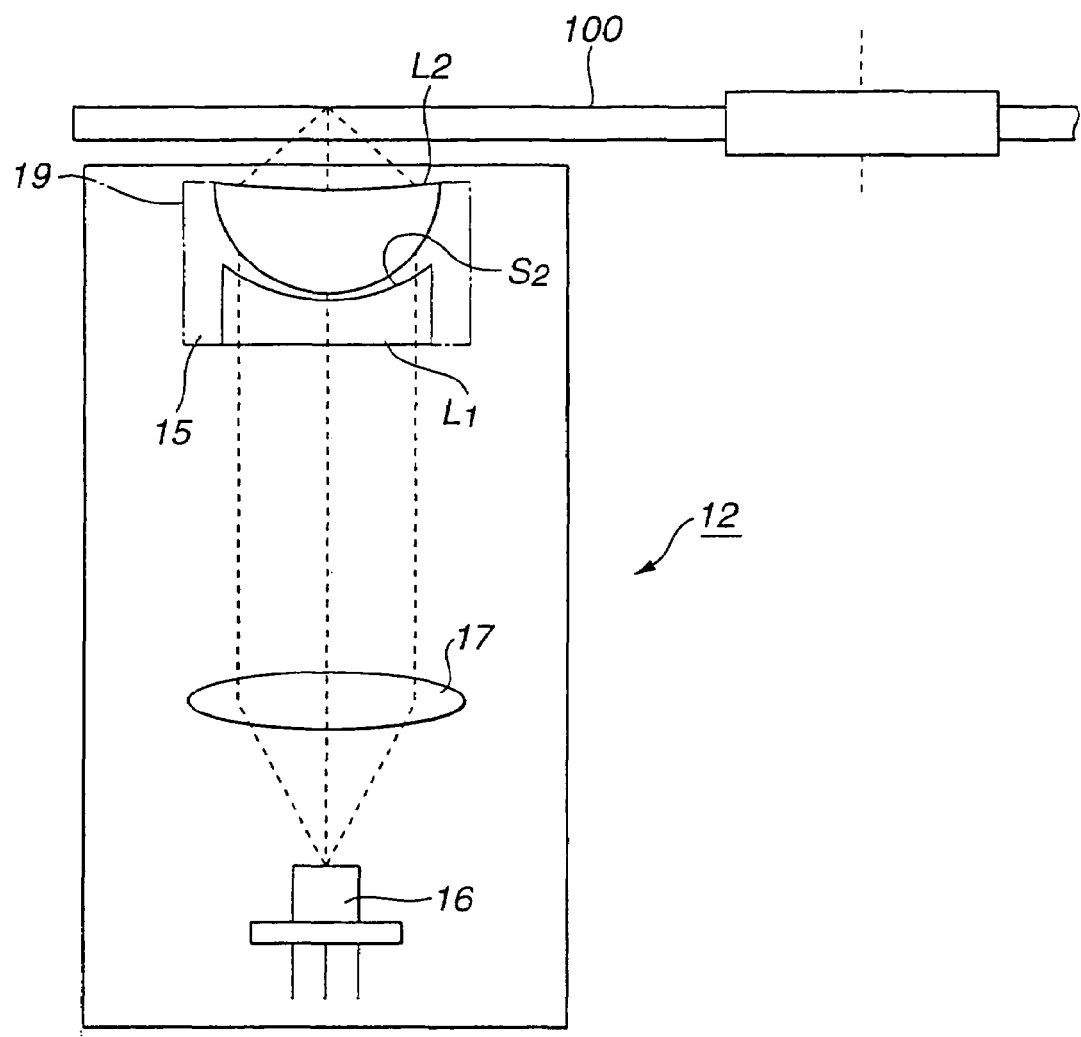
FIG. 5 is a side view showing an optical pickup embodying the present invention.

The optical pickup 12 is shown in FIG. 4, includes optical elements, such as a light emitting element, emitting laser light, or a light receiving element, and a biaxial actuator, not shown, for supporting an objective lens 15, loaded on a movable base 14 supported by the movable frame 10 by the guide shaft and the lead screw, not shown. The optical pickup 12 includes an objective lens 15, carried by the biaxial actuator, not shown, a laser light emitting element 16 for radiating the laser light with the wavelength not larger than 420 nm, and a collimator lens 17 for collimating the laser light radiated from the laser light emitting element 16, as schematically shown in FIG. 5. The laser light, radiated from the laser light emitting element 16, comprised of the semiconductor laser, is collimated by the collimator lens 17 so as to be converged by the objective lens 15 on the recording surface of the optical disc 100.

The optical pickup 12 is used for recording the information on the optical disc 100, having a high information recording density, for reproducing the information recorded on the optical disc 100. The laser light emitting element 16, used in this optical pickup 100, generates the laser light with a wavelength not larger than 420 nm, which is shorter than the wavelength of 780 nm generated by a laser light emitting element of the conventional CD standard, specifically, the laser light with a wavelength on the order of 400 to 410 nm. The high frequency current is superposed on the driving current to reduce the laser noise so that the laser light wavelength will be varied in short periods.

In recording the information on the optical disc 100, the laser light of high energy is radiated from the laser light emitting element 16 and collimated by the collimator lens 17. The laser light thus collimated falls on the objective lens 15 so as to be converged on the recording layer of the optical disc 100 to form a laser spot thereon. The energy of this laser light causes the recording layer to undergo e.g., phase change to form pits corresponding to the recorded information.

In reproducing the information recorded on the optical disc 100, the laser light of an energy lower than in recording the information is radiated from the laser light emitting element 16 and collimated by the collimator lens 17. The laser light thus collimated falls on the objective lens 15 so as to be converged on the recording layer of the optical disc 100 to form a laser spot thereon. The laser light reflected by the recording layer of the optical disc 100 is transmitted through an optical path which is the reverse of the optical path of the laser light incident on the optical disc 100 so as to be detected by a light receiving system, not shown, including the light receiving element in the optical pickup 12.

The operating length of the objective lens 15, that is the distance from the surface of the lens of the lens set of the objective lens 15 closest to the optical disc 100 to an image point, that is the recording layer on which is converged the laser light of the optical disc 100, is set to not less than 0.5 mm.

The objective lens 15 of the present invention is now explained in more detail.

As shown in FIG. 5, and as also shown in FIGS. 20, 22, 24, 26 and 28 showing concrete embodiments, as later explained, the objective lens according to the present invention includes a first lens set GR1 comprised of a first lens L1 and a second lens set GR2 comprised of a second lens L2. The first lens L1 is a hybrid type lens having a refractive and diffractive compound surface which is composed of a refractive surface $S_{2r}$ as a base surface, and a diffractive surface $S_{2d}$ added thereto, while the second lens L2 is a single lens of the meniscus shape both surfaces of which are comprised of aspherical surfaces, with the second lens having a positive refractive power. The refractive and diffractive compound surface is referred to below simply as the compound surface.

The first lens set GR1 plays the role of correcting chromatic aberration, while the second lens set GR2 plays the role of converging the beam spot of the laser light to a preset size.

In the following explanation, the surface numbers of the lenses and other constituent elements are counted sequentially in the order of 1, 2, 3, . . . from the light source (laser emitting element). It is noted that $[S_i]$, $[r_i]$ and $[d_i]$ denote the number i surface as counted from the light source side, the radius of curvature of the number i surface $S_i$ as counted from the light source and the spacing on the optical axis between the number i surface and the number i+1 surface as counted from the light source, respectively. The aspherical surface is defined by the following equation 1:

$$x = \frac{ch^2}{1+\sqrt{1-(1+k)c^2h^2}} + Ah^4 + Bh^6 + \\ Ch^8 + Dh^{10} + Eh^{12} + Fh^{14} + Gh^{16} + Hh^{18} + Jh^{12} \quad (1)$$

where [x] is the distance from the tangential plane of an apex point of an aspherical surface of a point on the aspherical surface having a height h from the optical axis, [c] is a curvature of the apex point of the aspherical surface (=1/R), [k] is a cone constant, [A], [B], [C], [D]. [E]. [F], [G], [H] and [J] denote the fourth to twentieth order aspherical coefficients, respectively.

In general, the diffractive optical element, used as a diffraction surface, is classed into an amplitude type and a phase type. The diffractive optical element, used as a diffraction surface $S_{2d}$ of the objective lens 15, is of the phase type, in particular a bladed hologram in the form of blades, from the perspective of efficiency. In this bladed hologram, similarly to the routine hologram, the polar coordinates on a substrate are specified, using a polynominal, as shift coefficients of the aspherical phase on each plane when two point light sources are assumed to be at points of infinity at the time of manufacture. The coefficients of the above polynominal give the optical path difference (OPD) at the reference wavelength of diffraction in mm. That is, the optical path difference by diffraction at a point of a height R from the optical axis on the diffraction surface is defined by $$OPD = C1R^2 + C2R^4 + C3R^6 + C4R^8 + C5R^{10} + C6R^{12} + C7R^{14} + C8R^{16} + C9R^{18} + C10R^{20}.$$

The actual shape of the diffraction surface is interruptedly changed in order to produce diffraction. That is, since the optical path difference between the optical path in a medium with a refractive index N and the optical path in air is given by t(N−1), the step difference d of the respective ring zones (elements) of the diffraction surface is given by $$d = \lambda/(N-1)$$

or integer number multiples thereof. In the above equation, λ is the design wavelength in nm. The blade shape of the diffraction surface gives to the surface shape the depth yielded as the remainder obtained on dividing the optical difference OPD by the wavelength λ.

The first lens L1 is formed of glass or resin, and includes a compound surface $S_2$ obtained on adding a diffractive surface $S_{2d}$ to a refractive surface $S_{2r}$, that is a reference surface which defines the diffractive surface. The diffractive surface $S_{2d}$ is formed directly on the refractive surface $S_{2r}$, using a metal mold manufactured by machining using a diamond byte. Alternatively, the diffractive surface $S_{2d}$ carrying a phase transmission type hologram may be formed on the surface of a resin layer 18 deposited by any suitable method on the refractive surface $S_{2r}$. By employing the compound surface $S_2$, having the diffraction surface $S_{2d}$, it is possible to increase the numerical aperture (NA) without increasing the lens diameter. The diffraction surface $S_{2d}$ is formed to have a fine staircase shape when seen in cross-sectional view, as explained subsequently. The refractive surface $S_{2r}$ of the objective lens 15, as the base surface, is a parabolic surface, with a cone constant k=−1.

With the objective lens 15, a third surface $S_3$ and a fourth surface $S_4$ of the second lens L2 are formed as aspherical surfaces.

The objective lens 15, made up by two lens groups, is arranged within a lens barrel 19 formed of a suitable material, such as synthetic resin, as shown in FIG. 5. Although not shown in detail, the lens barrel 19 is of a substantially cylindrica shape, having its both ends opened. The first and second lenses L1, L2 are introduced into the inside of the lens barrel 19 from the end openings and secured in position such as by centering. By arranging the objective lens 15, comprised of two lens sets, in the lens barrel 19 subject to advance optical adjustment of the component lenses, such as centering, it is possible to improve operational performance at the time of assembling the objective lens 15 into the optical pickup 12.

Since the first lens set GR1 is made up by the planar first surface $S_1$ and the compound surface $S_2$ formed by a refractive surface $S_{2r}$ having a negative refractive power and a refractive surface $S_{2d}$ having a positive refractive power, the total quantity of the refractive power is equal to zero (0). By setting the refractive power of the first lens set GR1 to zero, the first lens set GR1 operates as a completely plan-parallel plate with respect to the light of the design wavelength, or operates simply as a lens of an extremely small refractive power, even if the wavelength undergoes shifting, so that, when the first lens set GR1 is inserted into a space between the collimator lens 17 and the second lens set GR2 operating for converging the laser light, the offset, tilt or the spacing can be designed with a broader tolerance. By employing the first lens set GR1 solely for correcting the chromatic aberration, with the operation of forming a beam spot being taken charge of only by the second lens set GR2, the role sharing between the lens sets can be more well-defined to provide for facilitated designing of the lens sets.

The objective lens 15 has a working distance, that is a distance from the trailing lens surface (fourth surface $S_4$) to the image point, equal to not less than 0.5 mm. With the lens comprised of two lens sets, with a large numerical aperture, such as a solid immersion lens (SIL), the working distance is sometimes on the order of 0.1 mm. If the working distance is this short, there is raised a problem that the collision between the objective lens and the optical disc is inevitable. For this reason, the present invention provides for the working distance between the trailing end surface and the image point which is to be 0.5 mm or more. On the other hand, the objective lens 15 is designed to have an effective focal length not larger than 1.875 mm.

The achromatic condition in converging the laser light to the threshold of diffraction in the objective lens 15, that is the condition for correction of the chromatic aberration, is now explained.

In general, the achromatic condition for a lens combined from a refractive type lens and a diffractive type lens, for a light source of light the wavelength of which is changed in a range from ±δ (nm) with respect to the wavelength λ, is derived as follows:

That is, the Abbe number vr for a range of the wavelength λ±δ, referred to below as partial Abbe number, may be expressed by the following equation 2:

$$v_d = \frac{N-1}{N_{+\delta} - N_{-\delta}} \tag{2}$$

where N, $N_{+\delta}$ and $N_{-\delta}$ denote the refractive indices of the vitreous material for the wavelengths of λ, $\lambda_{+\delta}$ and $\lambda_{-\delta}$, respectively.

On the other hand, the partial Abbe number $v_d$ of the diffractive type lens may be expressed by the following equation 3:

$$v_d = \frac{\lambda}{(\lambda + \delta) - (\lambda - \delta)}. \tag{3}$$

With the focal lengths $f_r$, $f_d$ of the refractive type lens and the diffractive type, lens respectively, the synthetic lens obtained on synthesizing these lenses has a focal length f which is given by the following equation 4:

$$\frac{1}{f} = \frac{1}{f_r} + \frac{1}{f_d} \tag{4}$$

while the achromatic condition of the image point on the optical axis is expressed by the equation 5:

$$f_r \cdot v_r + f_d \cdot v_d = 0 \tag{5}$$

From the above equations 4 and 5, the focal length $f_r$ of the refractive lens and the focal length $f_d$ of the diffractive type lens, shown by the following equation 6:

$$f_r = f \cdot \frac{1 - v_d}{v_r} \tag{6}$$

$$f_d = f \cdot \frac{1 - v_r}{v_d}$$

are derived.

Meanwhile, the partial Abb number $v_r$ of the refractive lens is determined by the refractive index of the lens material, whilst the partial Abb number $v_d$ of the diffractive lens is determined by the wavelength of the laser light used. If the fact that the refractive index of the lens material is varied with the wavelength, it may be said that the partial Abb number $v_r$ of the refractive lens is determined by the lens material and the wavelength of the laser light being used, while the partial Abb number $v_d$ of the refractive lens is determined solely by the wavelength of the laser light being used.

It should be noted that the refraction and the on-axis achromatic condition in the refraction-diffraction compound objective lens 15 of the present invention may be uniquely determined by the wavelength $\lambda$ of the laser light used, fluctuation of the laser light, that is variations in the wavelength $\delta$, lens material type, beam diameter of the incident laser light and the numerical aperture (NA).

With the objective lens for the optical pickup according to the present invention, the design wavelength and the beam diameter of the laser light and the numerical aperture (NA) of the objective lens represent fixed parameters, so that, if once the lens material type is determined, the on-axis achromatic condition in the refraction-diffraction compound objective lens is determined. For example, if NA=0.8, the beam diameter of the laser light is 3 mm, $\lambda$=410 nm, $\delta$=±10 nm and the lens material is LAH53 (trade name of a product manufactured by KK Ohara), the focal length of the refractive lens $f_r$ is 2.18 mm, while that of the diffractive lens $f_d$ is 13.31 mm.

In the objective lens 15 of the present invention, the first lens set GR1 and the second lens set GR2 play the role of correcting the chromatic aberration and of converging the laser beam spot to a preset size, respectively. The refractive index of the first lens set GR1 is zero, such that the sum total of the second lens set GR2 proves the refractive power of the objective lens 15. This may be expressed by the following equations 7 and 8:

$$\frac{1}{f_1} + \frac{1}{f_d} = 0 \tag{7}$$

$$f_2 = f \tag{8}$$

With the objective lens 15 of the present invention, the synthesized focal length of the refractive lens of the first lens set GR1 (having the first surface $S_1$ and the second surface $S_2$) and the second lens L2 of the second lens set GR2 proves the focal length fr of the totality of the refractive lenses, so that the following equation 9:

$$\frac{1}{f_r} = \frac{1}{f_1} + \frac{1}{f_2} - \frac{d}{f_1 \cdot f_2} \tag{9}$$

is obtained.

If, in designing an objective lens for an optical pickup, the focal length and the lens material are determined, f, $f_r$ and $f_d$ are determined automatically, and hence the focal length $f_1$ of the refractive type lens of the first lens set and the distance d between the first and second lens sets are also determined unequivocally.

Meanwhile, the position of the principal point of the refractive type lens is determined by the refractive index of the lens material, radius of curvature of each lens surface and the spacing between the surfaces, and is not fixed at a constant position. Thus, the distance between the principal points of the diffractive type lens and the synthesized refractive type lens is changed with design conditions. Therefore, the paraxial solution has to be derived by carrying out bending at the time of designing so that the above equation 6 will be met.

The designing of the staircase shape of the diffractive surface $S_{2d}$ of the compound surface $S_2$, which forms the phase diffraction type optical component, is hereinafter explained.

The sag ASP(r) of the diffractive surface $S_{2d}$ of the compound surface $S_2$ is defined, by a software for optical designing "CODEV", as indicated by the following equation 10:

$$ASP(r) = \frac{cr^2}{1 + \sqrt{1 - (1+k)c^2 r^2}} + Ar^4 + Br^6 + Cr^8 + Dr^{10}. \tag{10}$$

If, in the above equation 10, k=−1, the second order coefficient is c/2, so that the above equation reduces to a polynominal with only even number orders shown by the following equation 11:

$$ASP(r) = \frac{c}{2} r^2 + Ar^4 + Br^6 + Cr^8 + Dr^{10}. \tag{11}$$

On the other hand, the phase distribution $\Phi(r)$ of the diffractive surface $S_{2d}$ of the compound surface $S_2$ is defined by a polynominal composed only of the even number orders, as indicated by the following equation 12:

$$\Phi(r) = C_1 r^2 + C_2 r^4 + C_3 r^6 + C_4 r^8 + C_5 r^{10} \tag{12}$$

Thus, up to optical designing, the phase is treated as a continuously changing function, as indicated in the equation 12.

In the surface designing of the diffractive surface, the phase periodicity is exploited so that the remnant phase obtained on subtracting an integer multiple period from the phase period is used as a new phase distribution. Thus, the shape of the diffractive surface proves a discrete blade shape. Since this blade type discrete phase is calculated as the actual thickness of the bulk, the shape of the diffractive surface material is a discrete blade shape, with the height being a thickness affording a phase difference equal to an integer multiple of the wavelength.

Figure 6:
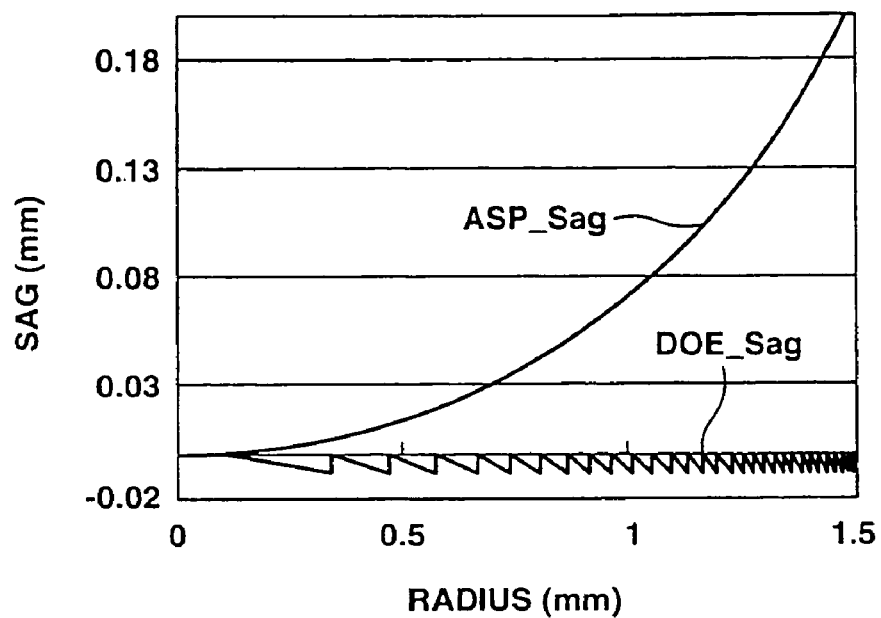
FIG. 6 is a graph showing the relation between the radial length of the objective lens for the optical pickup of the present invention and the sag in a diffraction surface and in both a diffraction surface and a refraction surface.

FIG. 6 illustrates the cross-sectional shape of the aspherical surface and that of the diffractive surface. The cross-sectional shape of the aspherical surface ASP_Sag is given by the above equation 11, while the cross-sectional shape of the diffractive surface DOE_Sag of the diffractive surface is given by the above equation 12. In order for the phase of the diffractive surface to be of the same dimension as that of the sag of the refractive surface, the phase is divided by a refractive index difference.

Figure 7:
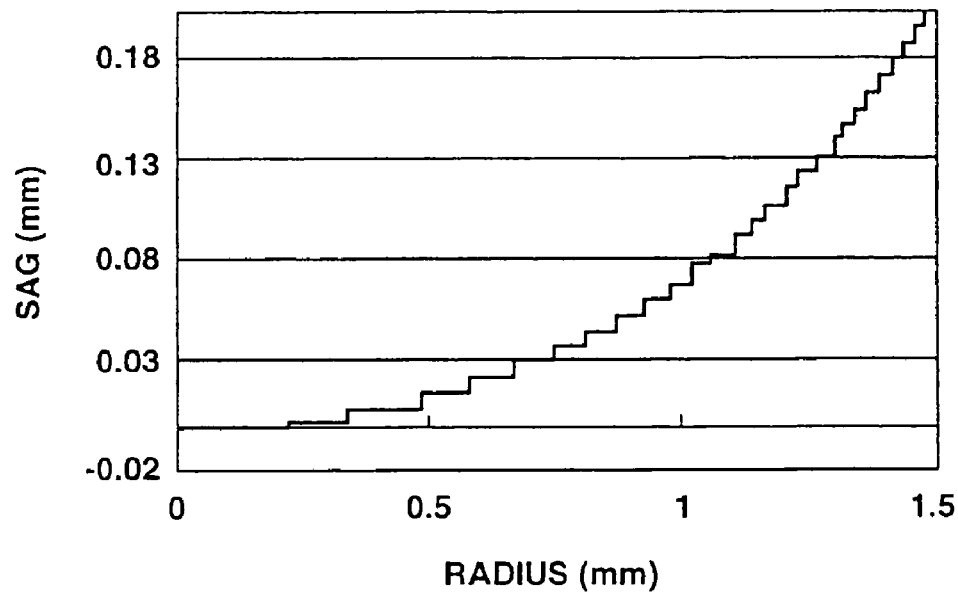
FIG. 7 is a graph showing the relation between the radial length of the objective lenses for the optical pickup of the present invention and the sag in a compound surface comprised of the combination of the diffraction surface and a refraction surface.

FIG. 7 illustrates the shape of the refraction-diffraction compound surface. The sag of the refraction-diffraction compound surface Sag(r) may be expressed as indicated in the following equation 13:

$$Sag(r) = ASP(r) + \frac{\Phi(r)}{N-1}. \tag{13}$$

If, in the above equation 13, Sag(r)=0, the phase is a complete surface, so that the incident light can be radiated unaffected. In this case, the diffractive surface is of a vertical staircase shape with the thickness giving a phase equal to an integer multiple of the wavelength as one step. That is, it suffices to select the solution of Sag(r)=0 so that coefficients of the respective order numbers will cancel one another to give zero, as indicated by the following equation 14:

$$k = -1 \tag{14}$$
$$C_1 = (N-1)\frac{C}{2}$$
$$C_2 = (N-1)A$$
$$C_3 = (N-1)B$$
$$C_4 = (N-1)C$$
$$C_5 = (N-1)D.$$

The coefficient of the second order indicates that the refractive powers of the refractive surface and the diffractive surface in the paraxial area cancel one another to give zero.

Referring to the drawings, the effect of the staircase shape of the diffractive surface as described above is hereinafter explained.

Figure 8:
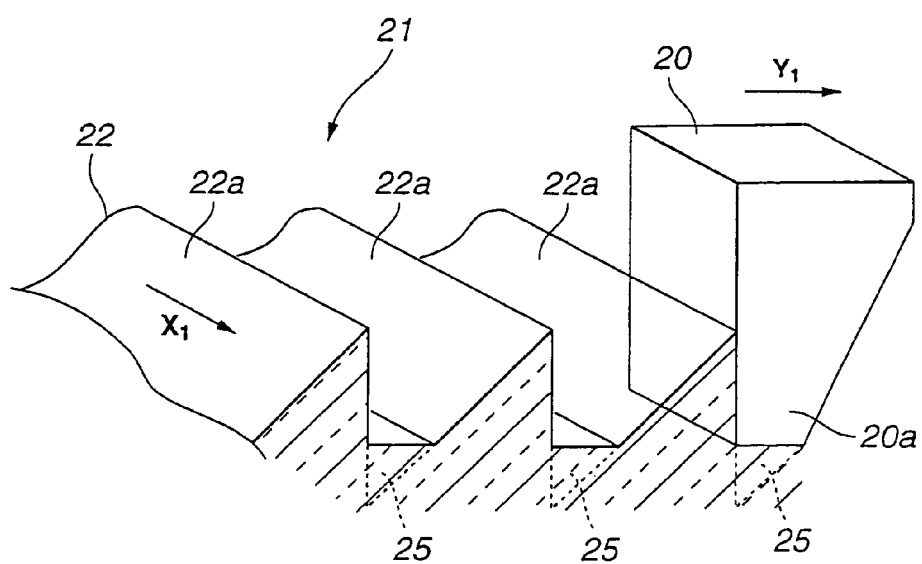
FIG. 8 is a schematic perspective view for illustrating the formulation of a blade mold diffraction surface by machining a transfer metal mold employing a diamond byte.
Figure 9:
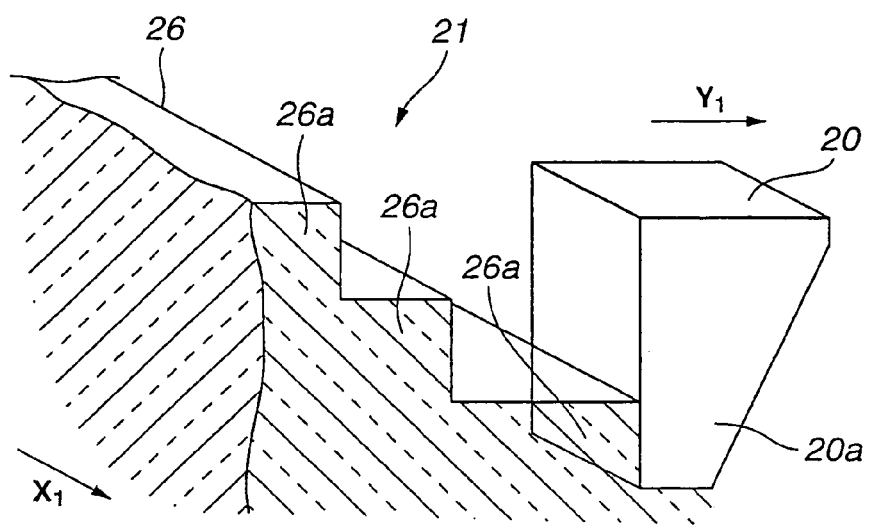
FIG. 9 is a schematic perspective view for illustration of formulation of a staircase type diffraction surface by machining a transfer metal mold employing a diamond byte.

FIGS. 8 and 9 illustrate machining problems and countermeasures to be taken in case the width of a distal end 20a of a byte 20 for machining a metal mold used for transcribing the diffractive surface directly on the diffractive surface $S_{2r}$ of the first lens L1 or on the surface of the layered resin layer 18, in the corse of manufacture of the objective lens 15, is of an non-negligible size with respect to the widths of respective ring zones 22a, 22a, . . . of the blade shape (shape of transcription) formed on a transcription surface 21 of a metal mold.

That is, when the diffractive surface is of a blade shape, the transcription surface 21 of a metal mold to be machined is fed in the direction indicated by arrow $X_1$, while the byte 20 is fed in the direction indicated by arrow $Y_1$, whereby the transcription surface 21 is machined to form the blade shape or transcription surface 22. It should be noted that the shape of the distal end 20a of the byte 20, if acute on visual check, is not acute as compared to the size of the ring zones 22a, 22a, . . . of the fine blade shape. Moreover, the shape of the distal end 20a cannot be made acute as compared to the size of the blade-like ring zones 22a, 22a, . . . . Consequently, non-machined portions 25, 25, . . . which are unable to be machined by the distal end 20a of the byte 20, are left between the ring zones 22a, 22a, . . . of the fine blade shape 22 of the transcription surface 21 of the metal mold.

Moreover, if the shape of the diffractive surface is the staircase shape as shown in FIG. 9, the transcription surface 21 of the metal mold to be machined is fed in the direction indicated by arrow $X_1$, while the byte 20 is fed in the direction indicated by arrow $Y_1$, as in the case of the blade shape of the diffractive surface, whereby the transcription surface 21 is machined to form the staircase shape 26. However, if the diffractive surface is of the staircase shape, the facets making up the ring zones 26a, 26a, . . . of the staircase shape include no facets disposed obliquely with respect to the surface making up the distal end 20a of the byte 20, so that there is no fear of the non-machinable portions being left, such as those described above.

Figure 10:
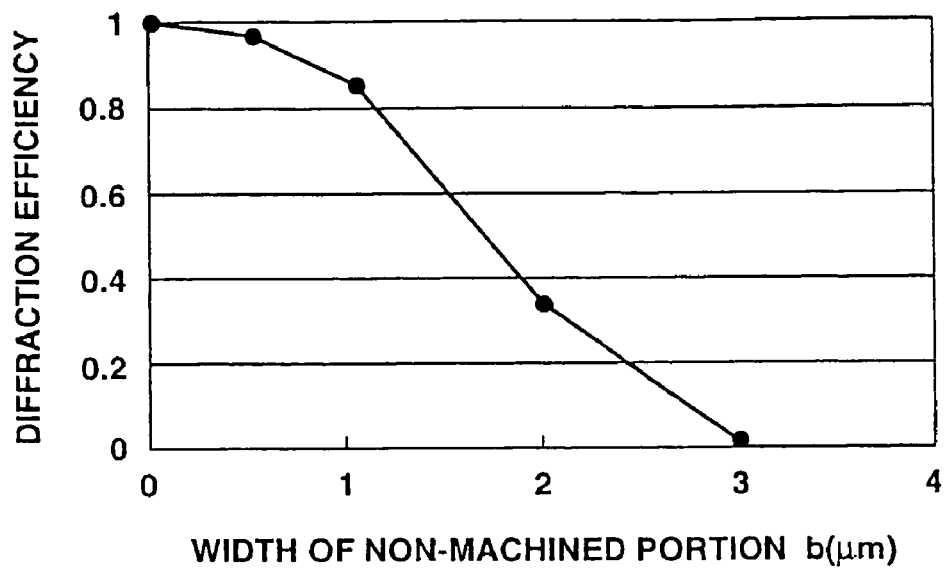
FIG. 10 is a graph showing the relation between the width of a non-machined portion left in forming the blade mold diffraction surface by machining a transfer metal mold employing a diamond byte.
Figure 11:
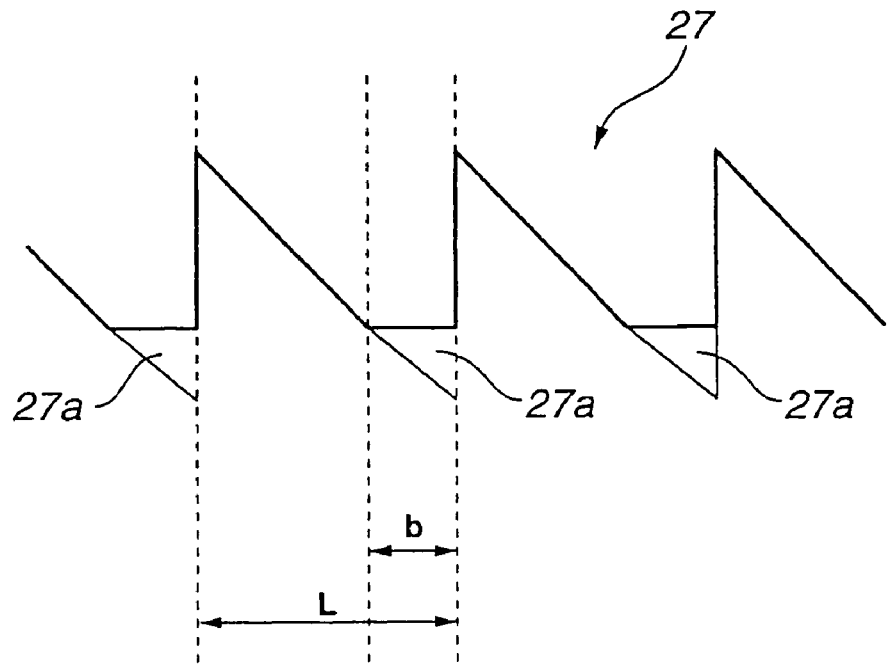
FIG. 11 is a schematic longitudinal cross-sectional view showing the shape of a blade mold diffraction surface when the width of the distal end of the diamond byte cannot be disregarded.
Figure 12:
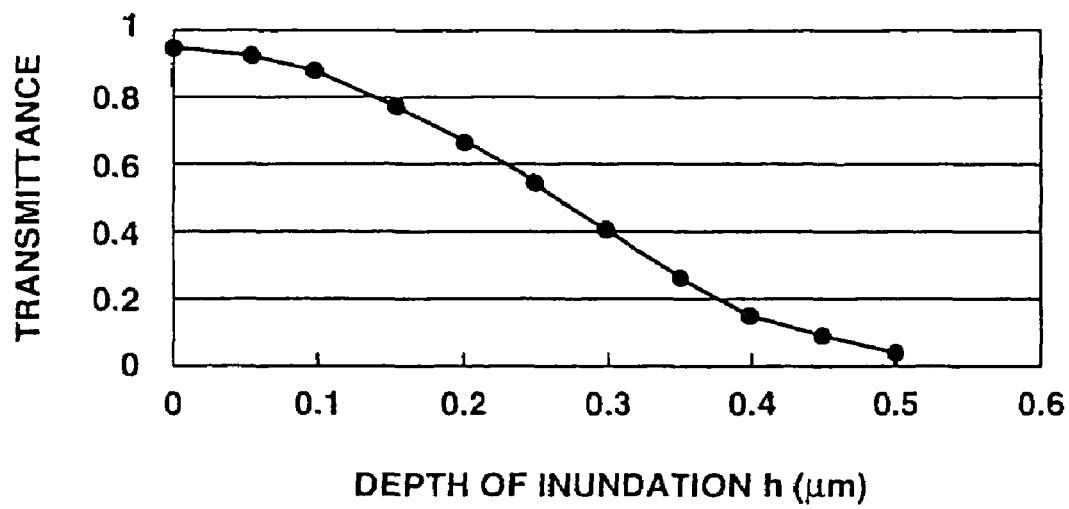
FIG. 12 is a graph showing the relation between the height of the undulating irregularities at the time of preparation of the blade type diffraction surface by the machining processing of a transcription metal mold employing a diamond byte.
Figure 13:
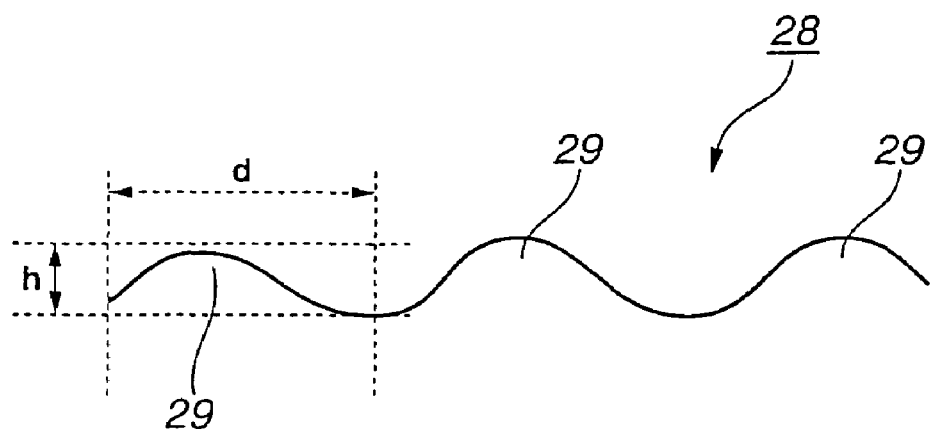
FIG. 13 is a schematic longitudinal cross-sectional view showing the shape of undulating irregularities at the time of preparation of the blade type diffraction surface by the machining processing of a transcription metal mold employing the diamond byte.

The graph of FIG. 10 shows the relation between the width b of the non-machinable portions 27a, 27a, . . . produced on transcription of the non-machinable portions 25, 25, . . . of the transcription surface 21 in the blade type diffraction grating 27, having a constant period L (blade width: 4 μm), as shown in FIG. 11, and the diffraction efficiency. FIG. 12 shows the relation between the depth h of the undulations 29 and the transmittance in an undulating irregularities surface structure 28, which is the shape of periodic fine micro-irregularities, with a period of d, produced on the transcription surface (machined surface) 21 as movement trajectory of the byte 20, as shown in FIG. 13.

Meanwhile, the diffractive surface which gives the 100% diffraction efficiency of the difference type lens has the blade-like cross-sectional shape. The blade height (sag) is a thickness which gives an integer multiple of the wavelength. If a diffraction type lens is produced on a surface, the cross-sectional shape is a blade shape.

If, in designing the diffraction type lens, the coefficients of the polynominal of the equation 13 are selected for cancelling the sag, the cross-sectional shape of the diffraction surface is the staircase shape transcribed by the transcription surface 21 of the metal mold, as shown in FIG. 9. The height of the staircase (sag) proves a thickness which gives the phase difference equal to an integer multiple of the wavelength, as in the case of the surface described above. It should be noted that, since the staircase shape may be thought of as a special case of the blade shape, the theoretical diffraction efficiency of the staircase shape is the same as that for the blade shape.

However, when the blade shape is afforded to the transcription surface 21 of the metal mold by machining with the byte 20, and the diffraction surface is of the blade shape in the cross-section including the inclined surface, the non-machinable portions 25, 25, . . . , that remain non-machined, are produced due to the shape of the distal end 20a of the byte 20, as shown in FIG. 8. If these non-machinable portions 25, 25, . . . become non-negligibly increased in size as compared to the blade shape 22, the diffraction efficiency is lowered in proportion to the size of the blade shape 22, as shown in FIG. 10. The non-machinable portions 25, 25, . . . become smaller the smaller (the acuter) the shape of the distal end of the byte 20.

In machining the transcription surface 21 of the metal mold, employing the byte 20, there is produced an undulated pattern 29 of a fine irregular shape, which is the movement trajectory of the byte 20, on the inclined surface of the blade shape, as shown in FIG. 13. If the period d of the undulating irregularities surface structure 28 as the repetitive shape of the undulated pattern 29 and the depth h of the undulated pattern 29 is of the same order of magnitude as or larger than the design wavelength of the lens, the transmittance is lowered in proportion to the value of the relative size of the period d to the depth h. In the case of FIG. 12, the period d is 0.8 µm. This undulated pattern 29 becomes smaller the smaller (acuter) the shape of the distal end 20a of the byte 20.

If the blade shape 22 is formed on the transcription surface 21 by machining employing the byte 20, there is produced a certain rule between the diffraction efficiency of the diffraction surface of the lens produced on transcription, and transmittance, depending on the shape of the distal end 20a of the byte 20.

If conversely the staircase shape 26 shown in FIG. 9 is to be formed on a transcription surface 21 of the metal mold, by machining employing the byte 20, no non-machinable portions, such as the non-machinable portions 25, 25, . . . , produced in the case of the blade shape 22, are left, because no inclined facet is included in the facet produced on machining, with the consequence that the produced cross-sectional shape is close to the ideal cross-sectional shape. Thus, if the diffraction surface is that obtained on transcription of the staircase shape 26, it becomes possible to eliminate the factor of lowering the diffraction efficiency. Moreover, since there is no constraint on the shape of the distal end 20a of the byte 20, such a byte shaped to help suppress the formation of the undulating irregularities surface structure 28 shown in FIG. 13 may be selected as the byte 20 without dependency on the distal end shape, thus decreasing the factor of lowering the transmittance.

The influence of a fine irregular shape 39 formed on the compound surface of the objective lens 15 by transcription of the surface undulated structure 28 as the repetition of the saw tooth like projections 29 of the fine irregular shape formed on the transcription surface of the metal mold used for molding the objective lens 15 is now explained in detail.

Figure 14:
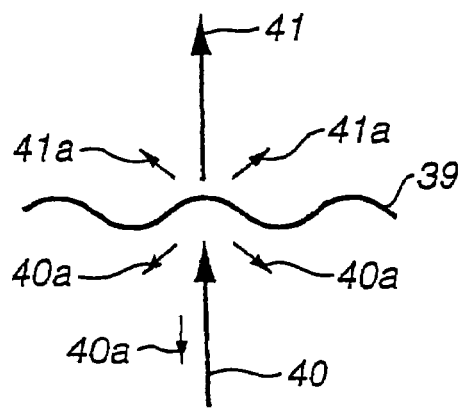
FIG. 14 shows the state of incident light and outgoing light on a surface presenting undulating irregularities.

The transmission and reflection of the laser light on the compound surface $S_2$ of the objective lens 15, carrying the fine irregular shape 39 as a result of transcription of the surface undulated structure 28 of the metal mold, are shown in FIG. 14. That is, part of a laser light beam 40 incident on the objective lens 15 proves a reflected light beam from the surface of the fine irregular shape 39 to lower the transmittance. A transmitted laser light beam 41, incident on and transmitted through the objective lens 15, is refracted in unforseen directions, depending on the surface shape of the fine irregular shape 39, thus generating stray light, such as stray light 41a, thus further worsening the transmittance of the surface carrying the fine irregular shape 39.

It should be noted that the, with the compound surface $S_2$ of the objective lens 15, the period of the surface undulated structure 28 of the metal mold and hence the period and the amplitude of the fine irregular shape 39 formed on the compound surface $S_2$ of the objective lens 15, can be controlled by optimally controlling the movement of the machining byte with respect to the material constituting the metal mold during machining the transcription surface 21 of the mold for producing the objective lens 15. The transmittance of the laser light of a preset wavelength can be controlled by controlling the period and the amplitude of the fine irregular shape 39 formed on the compound surface $S_2$ to preset conditions.

The fact that the transmittance of the objective lens 15, carrying the fine irregular shape 39, is further explained in detail.

For controlling the transmittance of the laser light of a preset wavelength, the surface undulated structure 28, formed on the transcription surface 21 of the metal mold for molding the objective lens 15, is formed to a concentric shape having a periodic structure with a period d on the order of about one half the reference wavelength ($\lambda$) of the laser light and with an amplitude h on the order of one quarter the reference wavelength ($\lambda$) of the laser light. By transcription of this surface undulated structure 28, the fine irregular shape 39 formed on the compound surface $S_2$ of the objective lens 15 has the similar period d and the amplitude h.

Preferably, the orientation of the fine irregular shape 39 is coincident with that of the transcribed blade shape, that is, the fine irregular shape is similar to the transcribed blade shape, with the blade shape being in register with the inclined surface of the fine irregular shape.

The process of forming the fine irregular shape 39 with the period d and the amplitude h as described above is now explained with reference to FIGS. 15 and 16.

Figure 15:
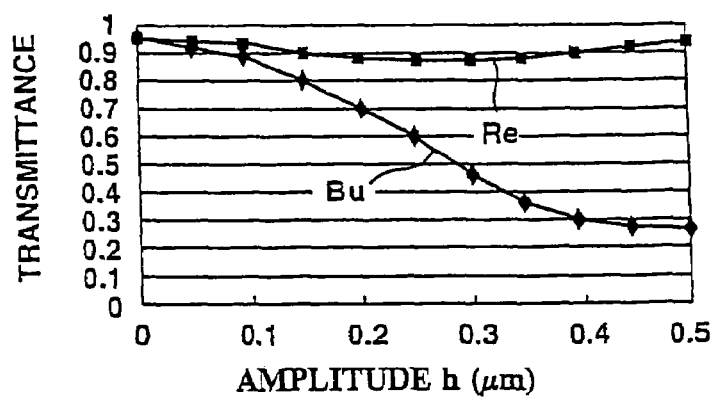
FIG. 15 is a graph showing the relation between the amplitude of the structure of irregularities in a diffraction surface used with red and blue laser light and transmittance. (Period=0.5 μm).

FIG. 15 shows the relation between the amplitude h and the transmittance in routine red laser light Re with the wavelength of 650 nm, and with blue laser light Bu, with the wavelength of 405 nm, used in the present invention, for the period d of the fine irregular shape 39 as the transcribed shape of the undulated structure equal to 0.5 µm.

Figure 16:
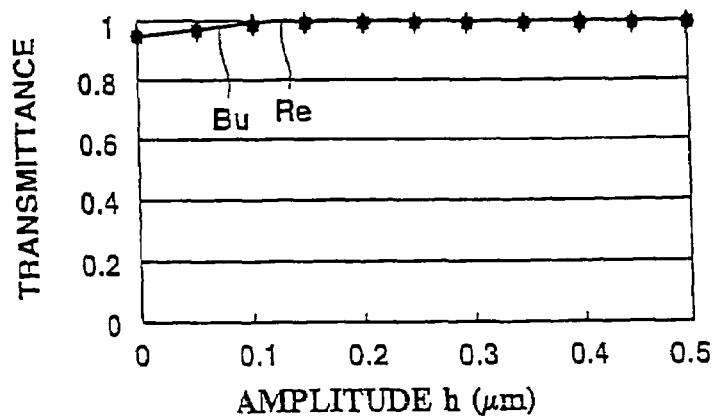
FIG. 16 is a graph showing the relation between the amplitude of the structure of irregularities in a diffraction surface used with red and blue laser light and transmittance. (Period=0.2 μm).

FIG. 16 shows the relation between the amplitude h and the transmittance in routine red laser light Re with the wavelength of 650 nm, and with blue laser light Bu with the wavelength of 405 nm, for the period d of the fine irregular shape 39 as the transcribed shape of the undulated structure equal to 0.2 µm.

It is seen from the graph of FIG. 15 that, with the fine irregular shape 39, having the period d of 0.5 µm, a transmittance on the order of 90% is possible when the amplitude h of the fine irregular shape 39 is 0.33 µm, as an amplitude which gives the phase difference on the order of one quarter of the wavelength of the red laser light Re with red laser light Re. However, with the laser light Bu, only a transmittance on the order of 70% can be achieved when the amplitude d of the fine irregular shape 39 is 0.2 µm, as an amplitude which affords a phase difference on the order of one quarter of the wavelength of the blue laser light.

It may also be seen from the graph of FIG. 16 that, with the fine irregular shape 39 having a period d of 0.2 µm, a transmittance on the order of 90% is achieved even if the amplitude h of the fine irregular shape 39 for the red laser light Re is set to 0.33 µm, as an amplitude which gives the phase difference on the order of one quarter of the wavelength of the red laser light Re, or if the amplitude d of the fine irregular shape 39 for the blue laser light Bu is set to 0.2 µm, as an amplitude which gives the phase difference on the order of one quarter of the wavelength of the blue laser light Bu.

With the objective lens 15 of the present invention, in which the diffraction surface $S_{2d}$ of the compound surface $S_2$ is of a fine staircase-like cross-sectional shape and in which the period d and the amplitude h of the fine irregular shape 39 formed on the staircase-like surface, are set as described above, it is possible to alleviate the problem of the lowering of the diffraction efficiency and that of the lowering of the transmittance simultaneously.

By referring to the drawings, another embodiment of an objective lens according to the present invention is now explained.

Similarly to the objective lens 15, described above, an objective lens 55, shown in FIGS. 17 and 18, is of a double lens set structure comprised of a first lens set GR1, made up by a first lens L1 of the hybrid type lens having a first surface $S_1$ as a refractive surface and a second surface $S_2$, combined together with the first lens surface to form a refraction-diffraction compound surface, and a second lens set GR2, made up by a second lens L2, as a single lens having a third surface $S_3$ and a fourth surface $S_4$, both being aspherical surfaces.

The portions common to those of the above-described objective lens 15 are depicted by common reference numerals and detailed description therefor is omitted for simplicity.

Figure 17:
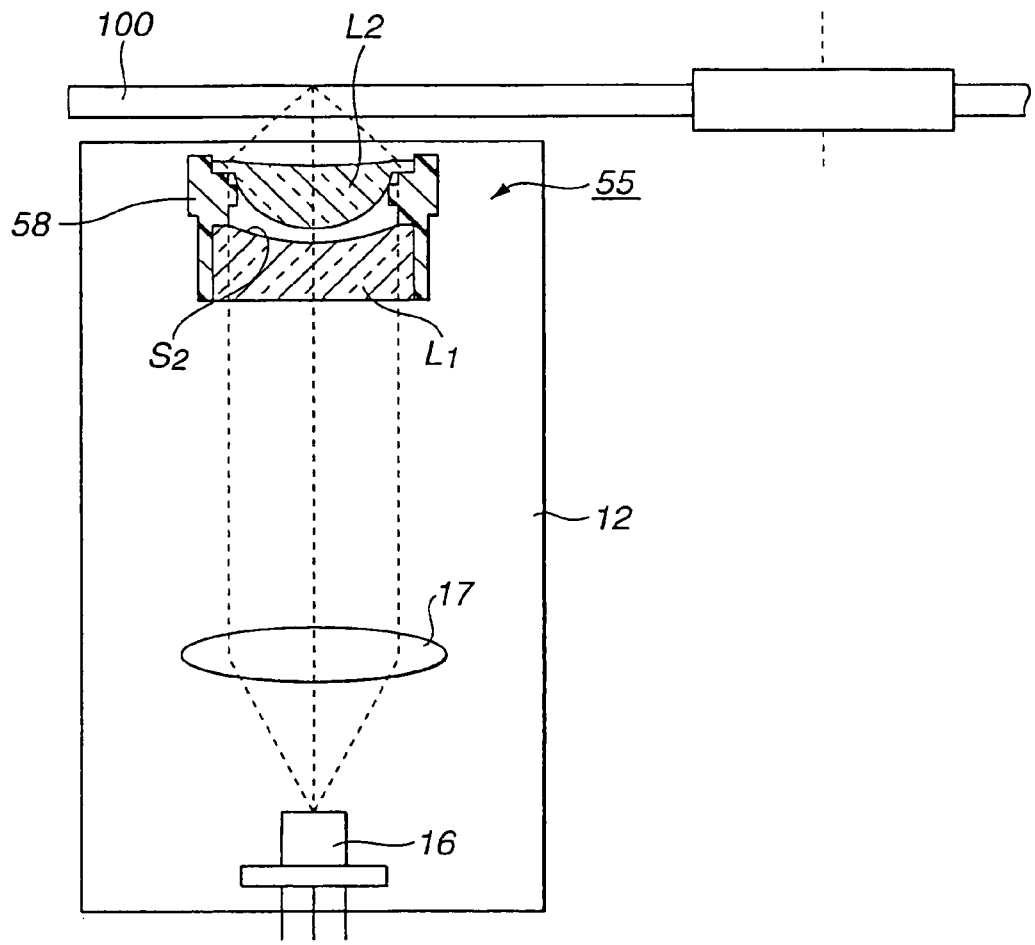
FIG. 17 is a side view showing another embodiment of an optical pickup embodying the present invention.
Figure 18:
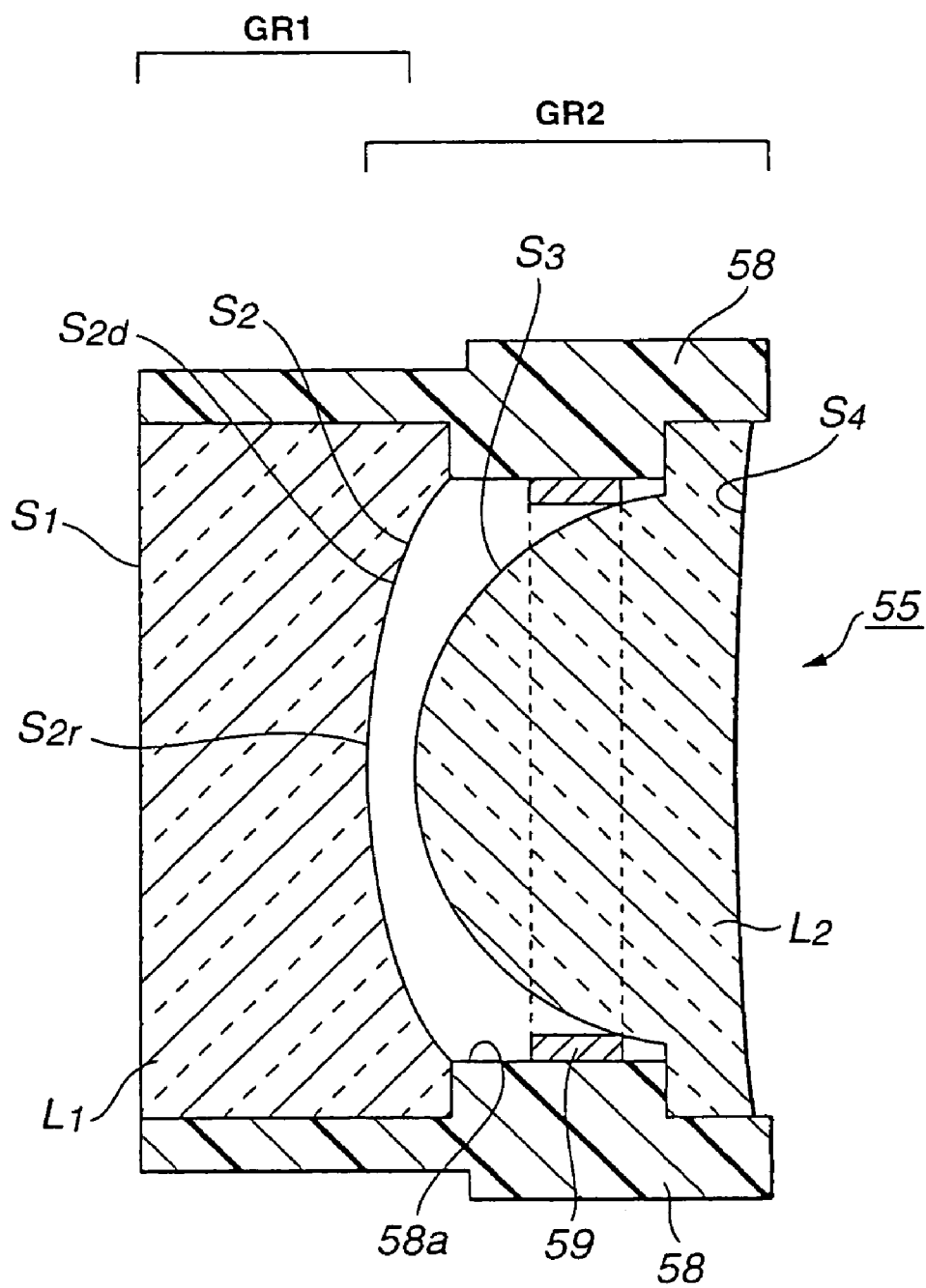
FIG. 18 is a side view showing another embodiment of an objective lens for an optical pickup embodying the present invention.

The double set structure objective lens 55 is arranged in a lens barrel 58, formed of any suitable material, such as synthetic resin, as shown in FIG. 18. The lens barrel 58 is formed to a substantially cylindrical shape, having both ends opened, with the first lens L1 and the second lens L2 being introduced into the inside thereof via both end openings and secured in position as the lenses are centered or adjusted in the respective mounting positions, as shown in FIG. 18. If the double set structure objective lens 55 is optically adjusted in its position, such as centering the respective constituent lenses in advance, and arranged in the lens barrel 58, it is possible to improve the working performance in assembling the objective lens 55 in an optical pickup 12, as shown in FIG. 17.

The objective lens 55 is provided with an aperture 59 between the first lens set L1 and the second lens set L2. Specifically, the aperture 59 is provided in the vicinity of the third surface $S_3$ towards the light source of the second lens set GR2, as shown in FIG. 18, in order to limit the light volume of the laser light incident on the second lens set GR2. The aperture is formed of the same material as the lens barrel 58 or formed to a substantially ring shape as a separate member and is suitably mounted by suitable means, such as by adhesion, to an inner peripheral wall 58a of the lens barrel 58. By arranging the aperture 59 in the vicinity of the third surface $S_3$ towards the light source of the second lens set GR2 having a large refractive power (second lens L2), only the portion of the lens having a satisfactory optical performance is restrictively used without employing the lens rim to stabilize the performance to provide for facilitated correction of various aberration types.

With the present objective lens 55, the first lens set GR1 is comprised of a first planar surface $S_1$ and a second compound surface $S_2$ made up by a refractive surface $S_{2r}$ having a negative refractive power and a diffractive surface $S_{2d}$ having a positive refractive power, whereby the sum total of the refractive power is equal to zero (0).

With the present objective lens 55, the working distance, that is the distance between the trailing lens surface (fourth surface $S_4$) and the image point, is set to not less than 0.5 mm, with the effective focal length being not larger than 1.875 mm.

Referring to the drawings, a further embodiment of an objective lens 65 of the present invention is hereinafter explained.

Figure 19:
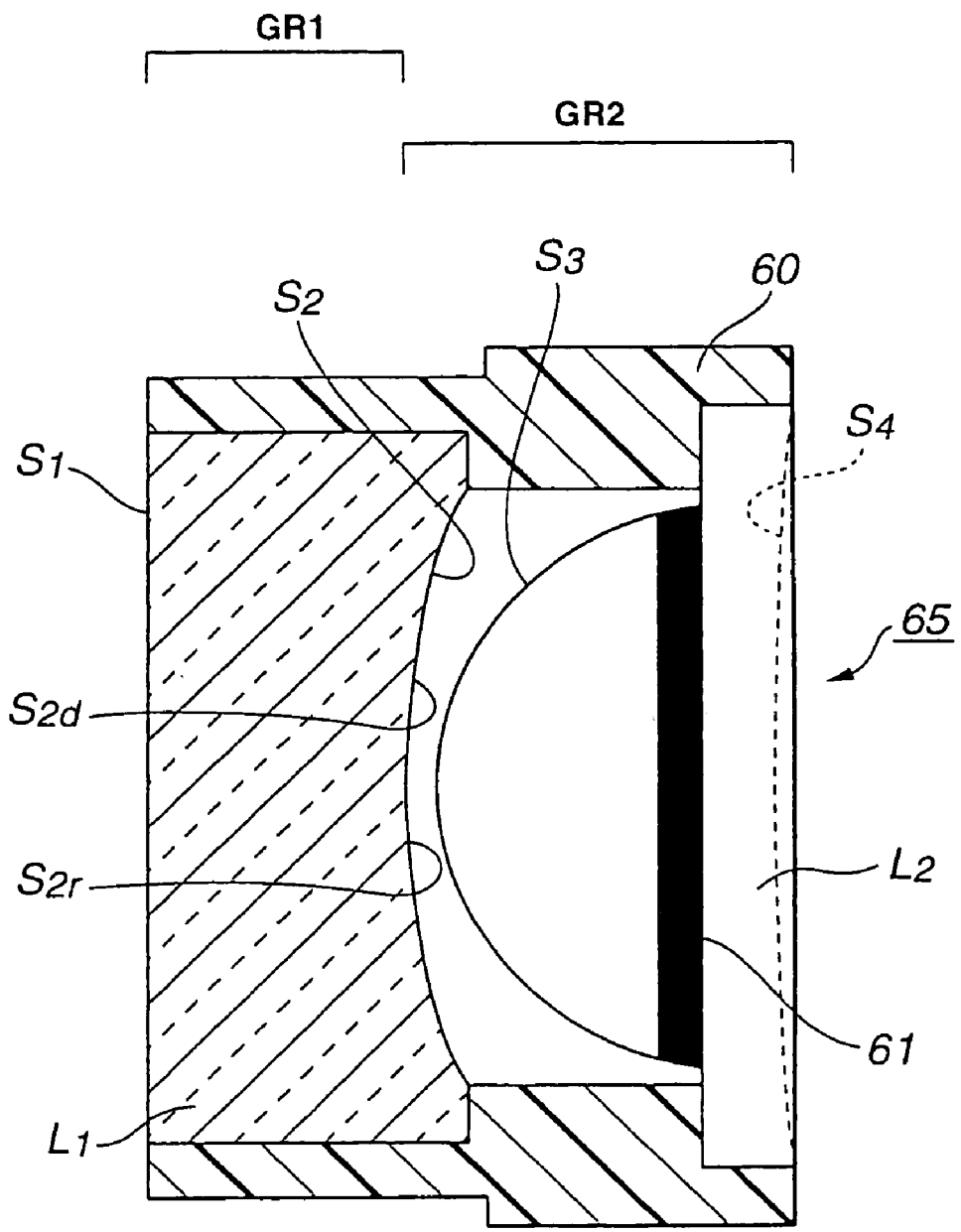
FIG. 19 is a longitudinal view showing a further embodiment of an objective lens for an optical pickup embodying the present invention.

Referring to FIG. 19, the objective lens 65 has a basic lens structure similar that of the objective lens 55 shown in FIG. 18, and is made up by a first lens set GR1 as a first lens L1 of the hybrid type lens having a second surface $S_2$ which is combined from a refractive surface $S_2$, and a diffractive surface $S_{2d}$, and a second lens set GR2, having a positive refractive power and which is made up by a second lens L2, as a single lens having a third surface $S_3$ and a fourth surface $S_4$, both being aspherical surfaces.

The first lens L1, forming the objective lens 65, is formed of a transparent resin material. The compound surface (second surface) $S_2$ is comprised of a refractive surface $S_{2r}$ of the first lens L1 of synthetic resin as a base surface (reference surface for defining the diffractive surface) and a diffractive surface $S_{2d}$ provided to the refractive surface $S_{2r}$ comprised of a phase transmission type hologram of a blade structure formed by transcribing to the refractive surface $S_{2r}$, the blade shape formed by a suitable method, such as machining a transcription metal mold by a diamond byte.

The objective lens 65 is unitarily formed by the first lens L1 and a lens barrel 60 of the same material, as shown in FIG. 19. Thus, the lens barrel 60 has its one end closed by the first lens L1, while having its other end opened. With the present objective lens 65, unitarily formed by molding from the first lens L1 and the lens barrel 60, it is unnecessary to perform optical adjustment, such as centering or positioning of the first lens L1.

The second lens L2 is introduced into the inside of the lens barrel 60, formed as one with the first lens L1, and is secured in position as it is centered and adjusted in its mounting position. That is, the optical adjustment in the lens barrel 60 is required only as to the second lens L2. It is therefore only sufficient to perform the optical adjustment with respect to the second lens L2, so that the operational performance in assembling the objective lens 65 in the optical pickup 12 may be improved appreciably.

Since the objective lens 65 includes the first lens L1 and the lens barrel 60 formed unitarily of synthetic resin, as described above, the objective lens in its entirety may be reduced in weight.

The objective lens 65 is also provided with an aperture 61, in the form of a belt-shaped thin film, by vacuum-depositing suitable metal on the entire outer periphery of the third surface $S_3$ of the second lens L2 facing the light source side. The reason the aperture 61 is formed as one with the third surface $S_3$ of the second lens L2 is that, since the first lens L1 and the lens barrel 60 are formed as one integral unit, it is impossible to form the aperture integrally within the inside of the lens barrel 60 from the perspective of rapping at the time of molding.

By providing the aperture 61 in this manner on the third surface $S_3$ of the second lens L2 of the objective lens 65 facing the light source side, it is possible to reduce the assembling error of the aperture 61 to the second lens L2 of the objective lens 65, the assembling error of the aperture 61 to the second lens L2 may be reduced to zero, while only the lens portions exhibiting satisfactory optical performance is restrictively used to provide for stabilized performance.

With the present objective lens 65, it is again possible to correct the chromatic aberration at the image point on the optical axis with respect to the light of a wavelength within several nm about 420 nm or less as a reference.

An embodiment of an objective lens 15 according to the present invention is now explained.

Figure 20:
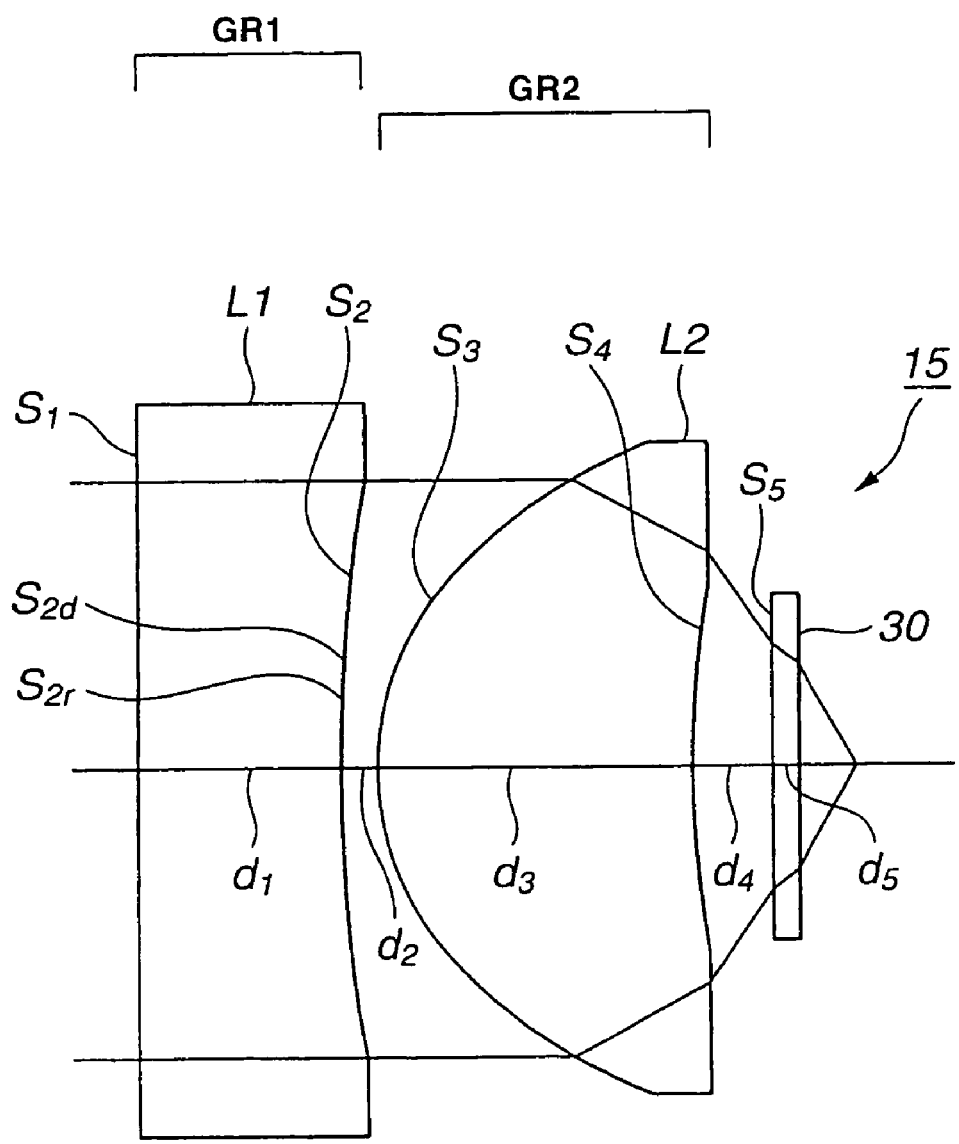
FIG. 20 shows a lens structure of a first embodiment of the objective lens for an optical pickup according to the present invention.

FIG. 20 shows a lens structure of the first embodiment of the objective lens 15 according to the present invention. This objective lens 15 is made up by a first lens set GR1, formed by a first lens L1 comprised of a plano-concave lens of glass, made up of a refractive surface $S_{2r}$ and a composite surface $S_2$ comprised of a diffractive surface, layered on the refractive surface $S_{2r}$ as base surface, and a second lens set GR2, formed by a second lens 12 as a single aspherical glass molded lens with a high power.

The vitreous material used for the first lens L1 and the second lens L2 is the aforementioned LAH53. Between the second lens L2 and the image surface (recording layer of the optical disc 100) is arranged a polycarbonate protective cover 30. Referring to FIG. 20, $S_5$ and $r_5$ denote a surface (fifth surface) and the radius of curvature of the protective cover 30, respectively, while $d_4$ and $d_5$ denote the spacing on the optical axis between the fourth surface $S_4$ and the fifth surface of the second lens L2, and a thickness of protective cover 22, respectively.

The thickness of the protective cover 30 is preferably not larger than 0.3 mm. In this first embodiment and the second embodiment, as later explained, the thickness of the protective cover 30 is set to 0.1 mm. The reason is that, if the thickness of the protective cover 30 is 0.3 mm or larger, spherical aberration is produced in an amount which renders correction difficult, whereas, if the thickness of the protective cover 30 is less than 0.3 mm, it is possible to suppress the generation of spherical aberration.

The numerical values of the constituent lenses of Example 1 are shown on the following Table 1:

TABLE 1

| $r_i$ | $d_i$ | material type |
|---|---|---|
| $r_1 = \infty$ | $d_1 = 1.00$ | LAH53 |
| $r_2 = 12.95$ | $d_2 = 0.20$ | |
| $r_3 = 1.337$ | $d_3 = 1.60$ | LAH53 |
| $r_4 = 6.486$ | $d_4 = 0.74$ | |
| $r_5 = \infty$ | $d_5 = 0.1$ | polycarbonate |
| image surface = $\infty$ | | |

The cone constant k and fourth to tenth order coefficients A to D of the compound surface $S_2$ (diffractive surface $S_{2d}$ and the refractive surface $S_{2r}$), as the second surface, the third surface $S_3$ and the fourth surface $S_4$ are indicated in Table 2. In Table 2 and in the Tables that follow, E denotes an exponential with ten as base.

TABLE 2

| surface | k($C_1$) | A($C_2$) | B($C_3$) | C($C_4$) | D($C_5$) |
|---|---|---|---|---|---|
| $S_{2d}$ | −3.231E−02 | −6.559E−03 | +5.139E−03 | −4.335E−03 | +9.493E−04 |
| $S_{2r}$ | −1.000 | +7.840E−03 | −6.142E−03 | +5.181E−03 | −1.135E−03 |
| $S_3$ | −0.386 | −0.356E−02 | +0.262E−02 | −0.113E−01 | +0.197E−01 |
| $S_4$ | −16.53 | −0.467E−01 | +0.355 | −1.184 | +1.680 |

Figure 21:
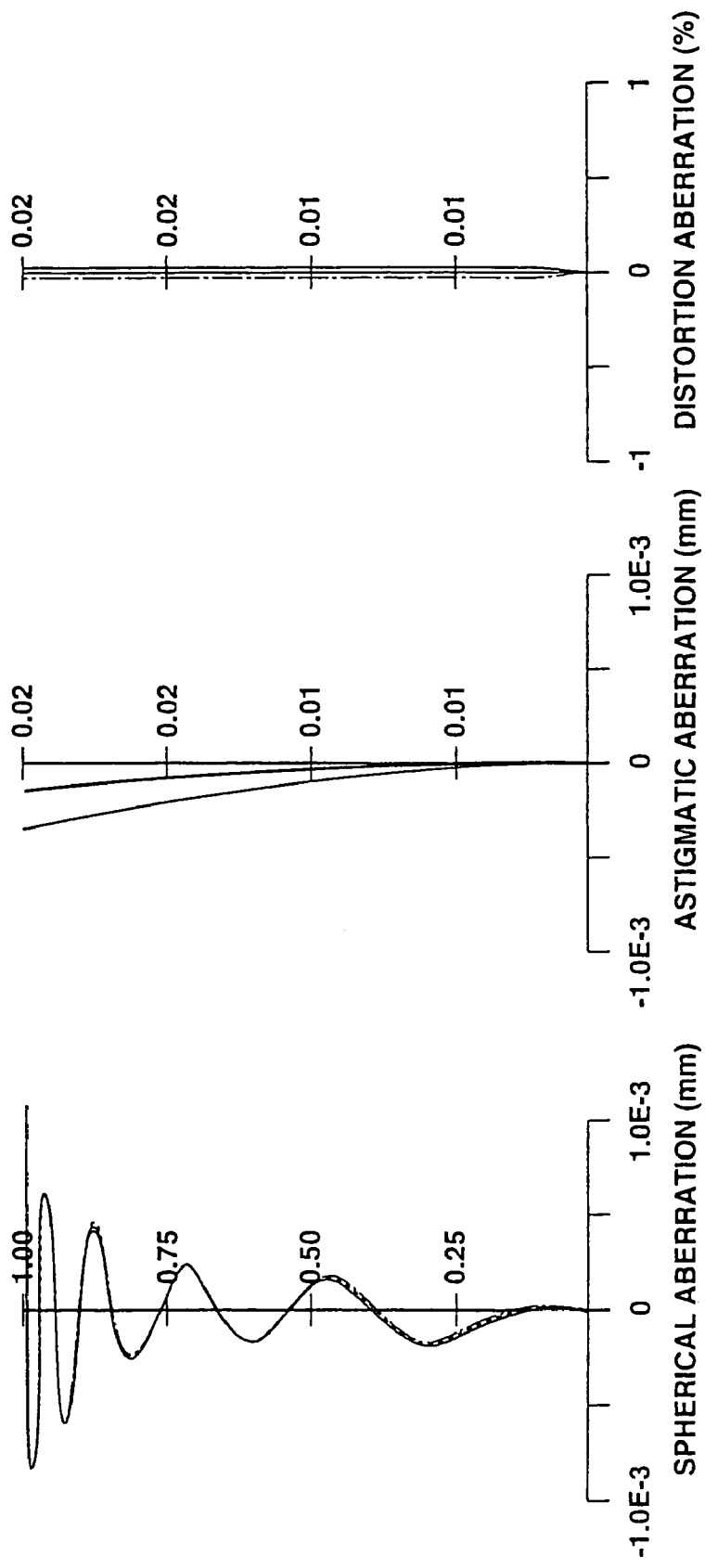
FIG. 21A is a graph showing spherical aberration of the first embodiment of the objective lens.
FIG. 21B is a graph showing astigmatic aberration thereof and FIG. 21C is a graph showing distortion aberration thereof.

FIGS. 21A, 21B and 21C show the spherical aberration, astigmatic aberration and the distortion aberration of the objective lens 15 of the first embodiment, respectively. In the aberration diagrams, shown in FIGS. 21A, 21B and 21C, solid, broken and chain-dotted lines indicate the values at 405 nm, 403 nm and at 407 nm, respectively. In the aberration diagram of FIG. 21A, thick lines and fine lines indicate values on the sagittal image surface and on the tangential image surface, respectively. The same applies for similar figures explained subsequently. The diffraction reference wavelength is 405 nm, the number of design order number is N=1, the design wavelength is 405 nm, the incident beam diameter of the laser light is 3.0 mm and the numerical aperture is 0.85.

Meanwhile, in the respective aberration diagrams of FIGS. 21A to 21C, the values at the wavelength of 405 nm, indicated by solid lines, those at a wavelength of 403 nm, indicated by broken lines and those at a wavelength of 407 nm, indicated by chain-dotted lines, substantially overlap one another to render decision almost impossible. This indicates that the objective lens 15 in the first embodiment suffers from chromatic aberration only to an extremely small extent. Thus, it may be seen that, in the present first embodiment, chromatic aberration of the objective lens 15 may be corrected effectively.

Figure 22:
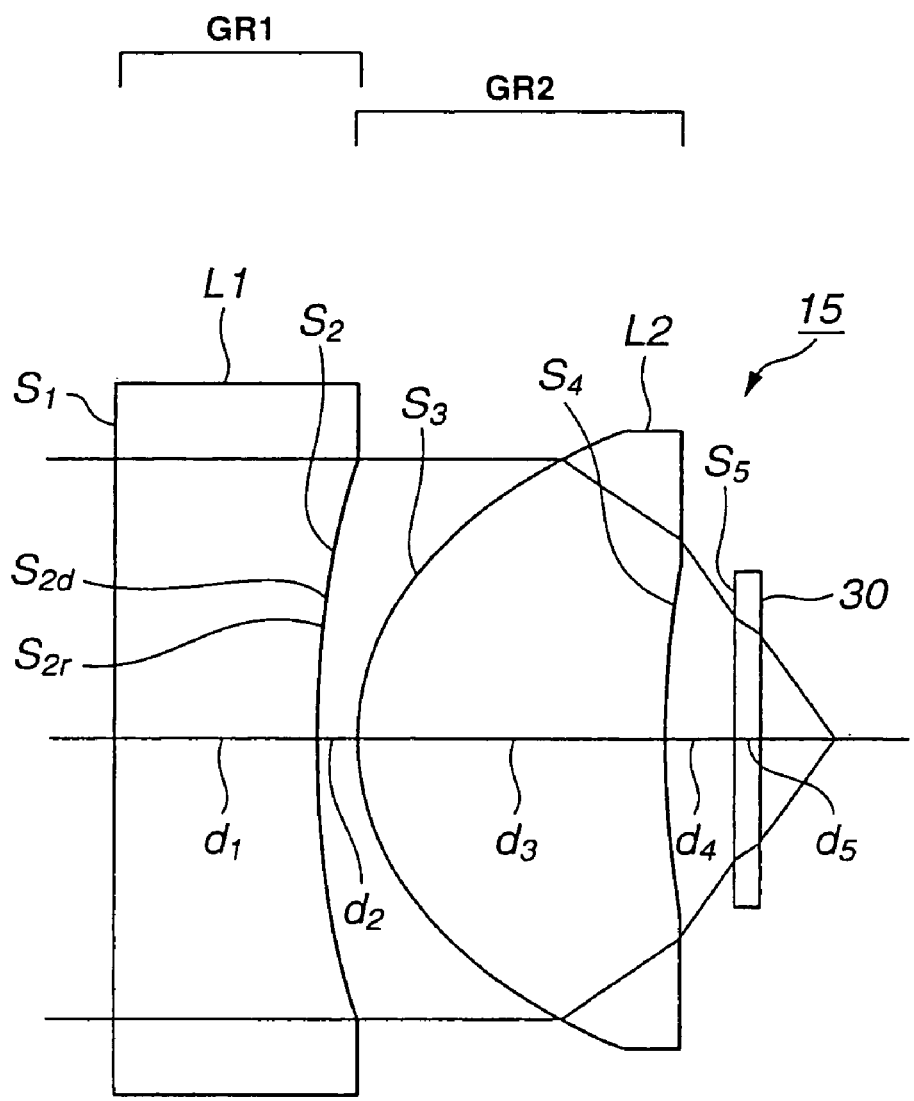
FIG. 22 shows a lens structure of a lens of a second embodiment of an objective lens for an optical pickup according to the present invention.

FIG. 22 shows a lens configuration of the second embodiment of the objective lens 15 according to the present invention. The first lens L1 is formed of a resin material while the second lens 12 is formed of the aforementioned LAH53.

The objective lens 15 of the second embodiment includes a first lens set GR1, formed by a first lens L1, as a piano-concave lens of synthetic resin, having a compound surface $S_2$ which is made up by a refractive surface $S_{2r}$ and a diffractive surface $S_{2d}$, constituted with the refractive surface $S_{2r}$ as the base surface, and a second lens set GR2, formed by a second lens L2, as a single large power aspherical glass molded lens. Between the second lens L2 and the image surface (recording layer of the optical disc 100) is arranged a polycarbonate protective cover 30.

The numerical values of the constituent lenses of the second embodiment are indicated in the following Table 3:

TABLE 3

| $r_i$ | $d_i$ | vitreous material |
|---|---|---|
| $r_1 = \infty$ | $d_1 = 1.00$ | synthetic resin |
| $r_2 = 7.650$ | $d_2 = 0.20$ | |
| $r_3 = 1.337$ | $d_3 = 1.60$ | LAH53 |
| $r_4 = 6.486$ | $d_4 = 0.74$ | |
| $r_5 = \infty$ | $d_5 = 0.1$ | polycarbonate |
| image surface = $\infty$ | | |

In the second embodiment, in which the first lens L1 is formed of synthetic resin, the objective lens 15 may be reduced in weight. Moreover, since the synthetic resin is less costly than glass, as a material, and superior to glass in workability, the objective lens 15 can be mas-produced at lower cost.

Table 4 shows a cone constant k and fourth to tenth order aspherical coefficients A to D of the compound surface $S_2$ (diffractive surface $S_{2d}$ and the refractive surface $S_{2r}$) as the second surface, third surface $S_3$ and the fourth surface $S_4$:

TABLE 4

| surface | $k(C_1)$ | $A(C_2)$ | $B(C_3)$ | $C(C_4)$ | $D(C_5)$ |
|---|---|---|---|---|---|
| $S_{2d}$ | −3.429E−02 | −6.323E−03 | +4.451E−03 | −4.022E−03 | +8.960E−04 |
| $S_{2r}$ | −1.000 | +1.205E−03 | −8.482E−03 | +7.666E−03 | −1.708E−03 |
| $S_3$ | −0.386 | −0.356E−02 | +0.262E−02 | −0.113E−01 | +0.197E−01 |
| $S_4$ | −16.53 | −0.467E−01 | +0.355 | −1.184 | +1.680 |

Figure 23:
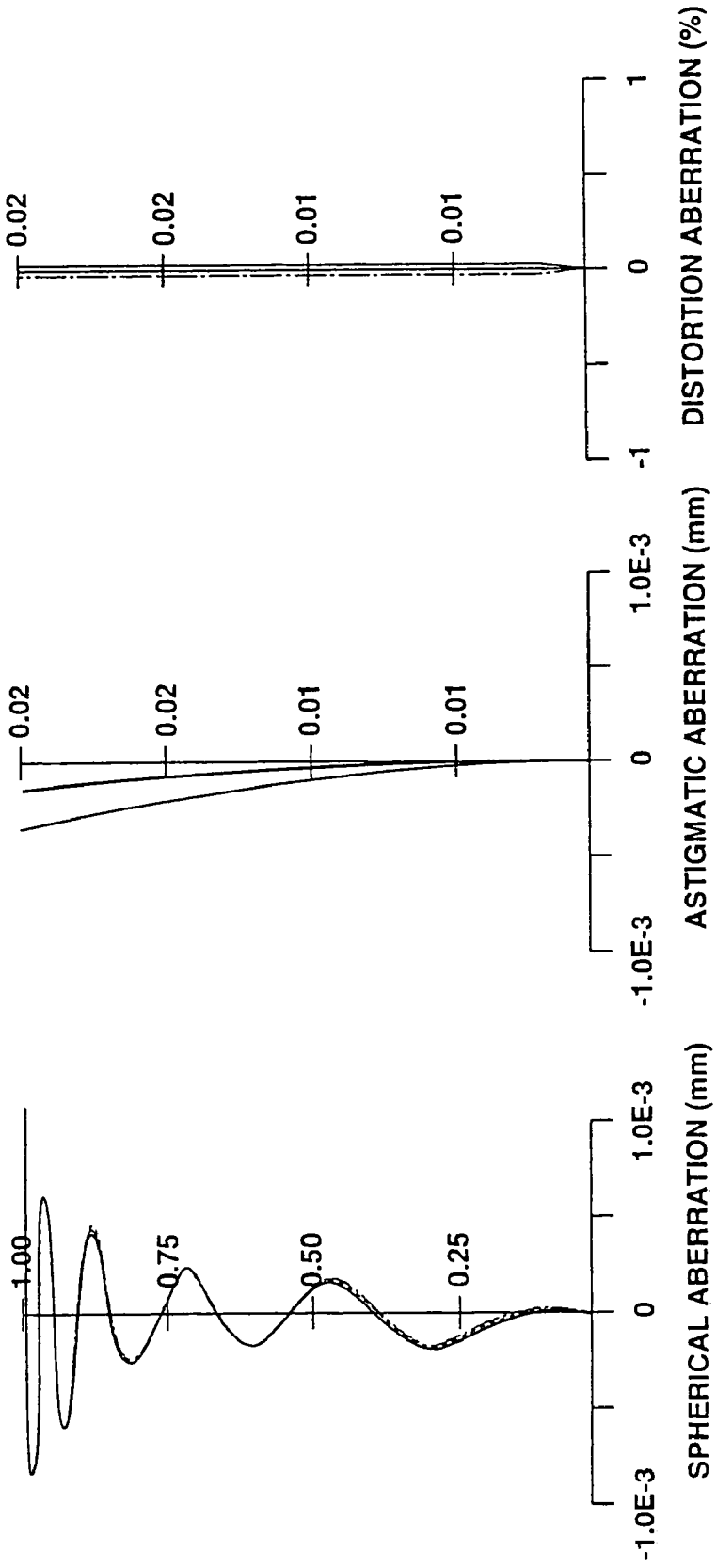
FIG. 23A shows a graph showing spherical aberration of the second embodiment of the objective lens.
FIG. 23B is a graph showing astigmatic aberration thereof and FIG. 23C is a graph showing distortion aberration thereof.

FIGS. 23A, 23B and 23C indicate the spherical aberration, astigmatic aberration and distortion aberration of the objective lens 15 of the second embodiment, respectively. The diffraction reference wavelength is 405 nm, the number of design order number is N=1, the design wavelength is 405 nm (403 nm to 407 nm) and the numerical aperture is 0.85.

In the respective aberration diagrams of FIGS. 23A to 23C, the values at the wavelength of 405 nm, indicated by solid lines, those at a wavelength of 403 nm, indicated by broken lines, and those at a wavelength of 407 nm, indicated by chain-dotted lines, substantially overlap one another to render it extremely difficult to discern them from one another. This indicates that the objective lens 15 in the second embodiment suffers from chromatic aberration only to an extremely small extent. Thus, it may be seen that, in the present second embodiment, chromatic aberration of the objective lens 15 of the second embodiment has been corrected effectively.

TABLE 5

| $r_i$ | $d_i$ | vitreous material |
|---|---|---|
| $r_1 = \infty$ | $d_1 = 1.00$ | SBSL7 |
| $r_{2r} = 7.750$ | $d_2 = 0.01$ | |
| $r_{2d} = 7.750$ | $d_3 = 0.20$ | synthetic resin |
| $r_3 = 1.337$ | $d_4 = 1.60$ | LAH53 |
| $r_4 = 6.486$ | $d_5 = 0.74$ | |
| $r_5 = \infty$ | $d_6 = 0.1$ | polycarbonate |
| image surface = $\infty$ | | |

Table 6 shows cone constants k and fourth to tenth order aspherical coefficients A to D of the compound surface $S_2$, as the second surface, made up by a diffraction surface $S_{2d}$ and a refractive surface $S_{2r}$, a third surface $S_3$ and a fourth surface $S_4$:

TABLE 6

| | $k(C_1)$ | $A(C_2)$ | $B(C_3)$ | $C(C_4)$ | $D(C_5)$ |
|---|---|---|---|---|---|
| $S_{2d}$ | −3.418E−02 | −7.456E−03 | +5.703E−03 | −4.609E−03 | +9.931E−04 |
| $S_{2r}$ | −1.000 | +1.408E−02 | −1.077E−02 | +8.702E−03 | −1.875E−03 |
| $S_3$ | −0.386 | −0.356E−02 | +0.262E−2 | −0.113E−01 | +0.197E−01 |
| $S_4$ | −16.53 | −0.467E−01 | +0.355 | −1.184 | +1.680 |

Figure 24:
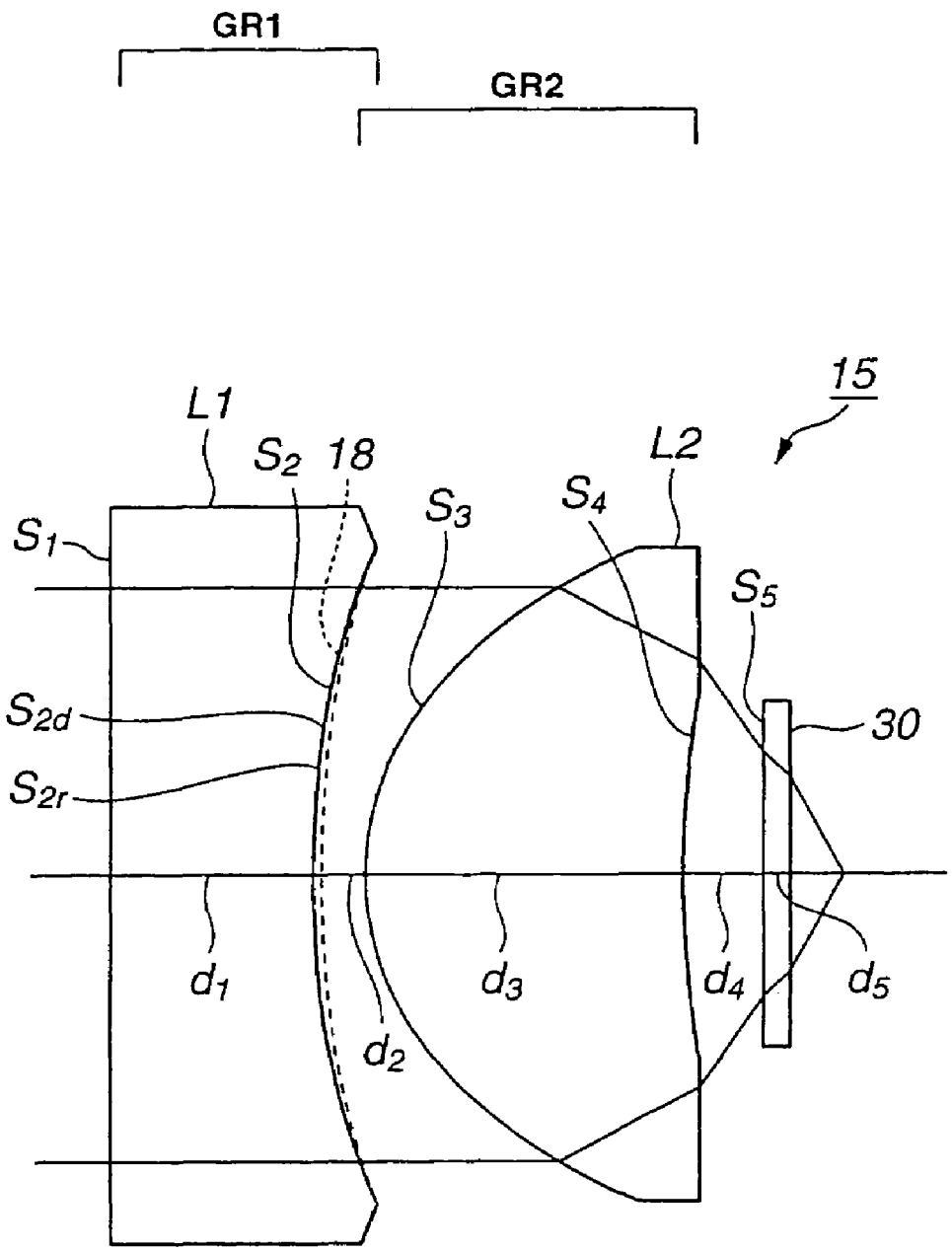
FIG. 24 shows a lens structure of a third embodiment of an objective lens for an optical pickup according to the present invention.

FIG. 24 shows a lens configuration of the third embodiment of the objective lens 15 according to the present invention, in which the first lens L1 is formed by SBSL7 (trade name of a product manufactured by Ohara KK) and the second lens L2 is formed by the aforementioned LAH53.

The objective lens 15 in the third embodiment is comprised of the first lens set GR1, formed by a piano-concave lens of glass, having a compound surface $S_2$ comprised of a synthetic resin layer 18 formed on a refractive surface $S_{2r}$, as a base surface and a diffractive surface $S_{2d}$ formed on the synthetic resin layer 18, and a second lens set GR2 formed by a second lens L2, which is a single high-power lense molded of glass in order to form an aspherical surface. Between the second lens L2 and the image surface (recording layer of the optical disc 100) is arranged a polycarbonate protective cover 30.

The numerical values of the constituent lenses of the second embodiment are indicated in the following Table 5:

In the third embodiment, the diffractive surface $S_{2d}$ is formed on the resin layer 18 layered on the refractive surface $S_{2r}$, because the first lens 11 is of SBSL17 which does not permit the compound surface to be formed by metal molding. Thus, even if a material which does not permit molding with a metal mold, such as vitreous material, is used for the first lens L1, the refraction-diffraction compound surface can be formed by layering the synthetic resin layer 18 on which has been transcribed the shape of the diffractive surface of the metal mold. The result is that the range of selection of the materials used for the first lens L1 can be broadened significantly.

Figures 25A, 25B, 25C:
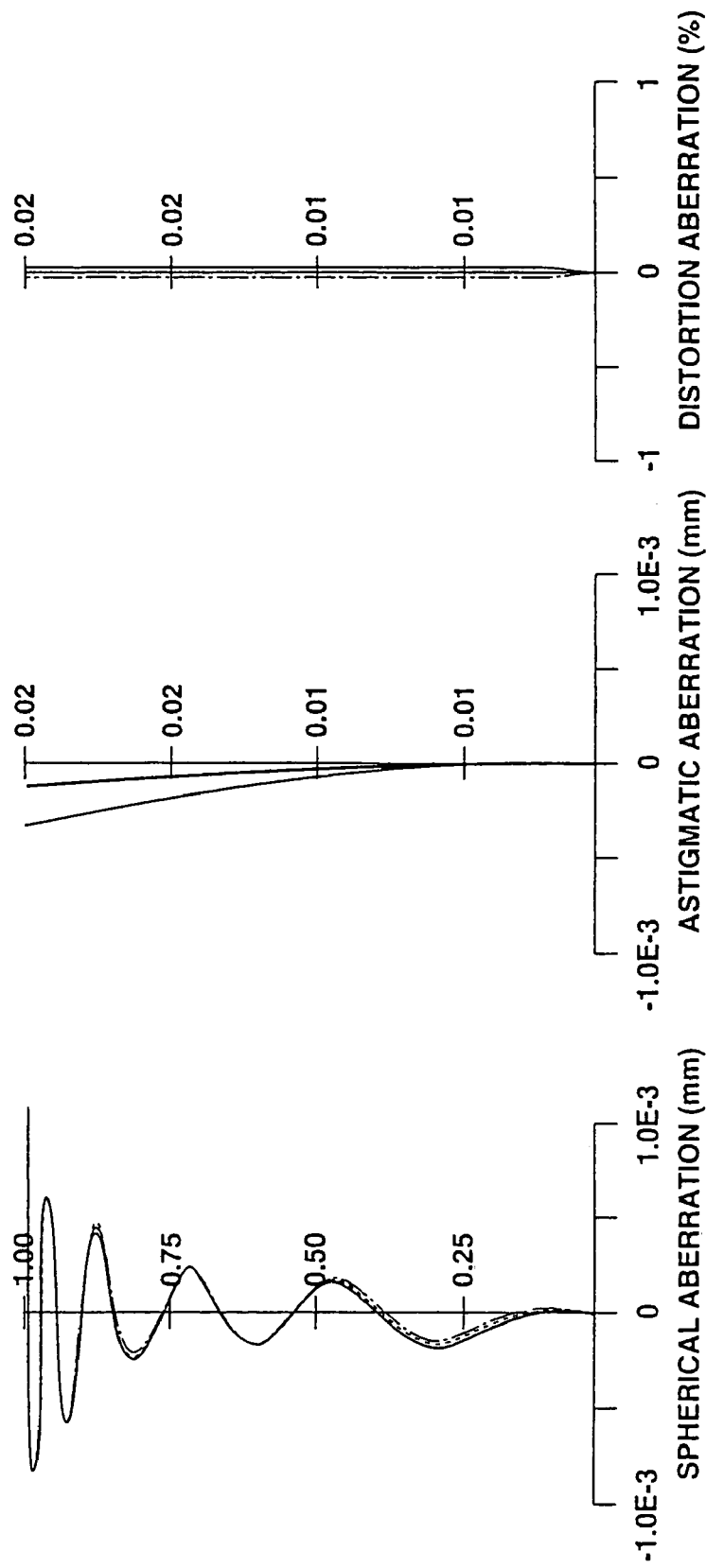
FIG. 25A shows a graph showing spherical aberration of the third embodiment of the objective lens.
FIG. 25B is a graph showing astigmatic aberration thereof and FIG. 25C is a graph showing distortion aberration thereof.

FIGS. 25A, 25B and 25C show the spherical aberration, astigmatic aberration and the distortion aberration of the objective lens 15 of the third embodiment, respectively. The diffraction reference wavelength, design order number N, design wavelength and the numerical aperture are 405 nm, 1,405 nm and 0.85, respectively.

In the respective aberration diagrams of FIGS. 25A to 25C, the values at the wavelength of 405 nm, indicated by solid lines, those at a wavelength of 403 nm, indicated by broken lines, and those at a wavelength of 407 nm, indicated by chain-dotted lines, substantially overlap one another to render it difficult to discriminate the respective aberration from one another. This indicates that the objective lens 15 in the third embodiment suffers from chromatic aberration only to an extremely small extent. Thus, it may be seen that, in the present third embodiment, chromatic aberration of the objective lens 15 has been corrected effectively.

Figure 26:
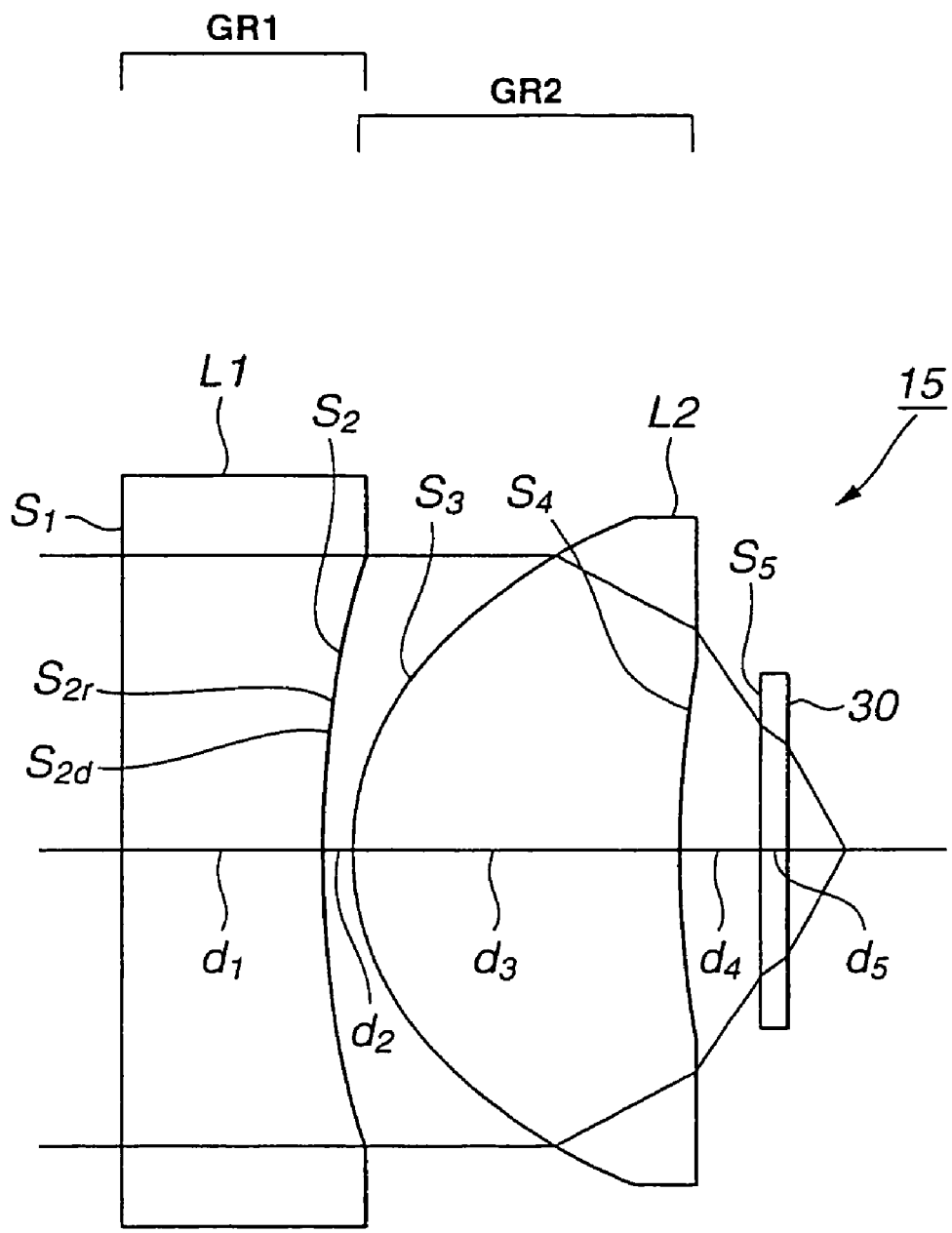
FIG. 26 shows a lens structure of a fourth embodiment of an objective lens for an optical pickup according to the present invention.

FIG. 26 shows a lens configuration of a fourth embodiment of the objective lens 15 according to the present invention, in which the first lens L1 and the second lens L2 are formed of a suitable synthetic resin material and LAH53, respectively, and in which the higher order diffracted light is used.

The objective lens 15 in the fourth embodiment is comprised of the first lens set GR1, formed by a plano-concave lens of glass, as a first lens L1, formed of a synthetic resin, and having a compound surface $S_2$ comprised of a diffractive surface $S_{2d}$ layered on a second surface or a refractive surface $S_{2r}$ as a base surface, and a second lens set GR2 formed by a second lens L2, which is a single high-power lense molded of glass so as to have an aspherical surface. Between the second lens L2 and the image surface (recording layer of the optical disc 100) is arranged a polycarbonate protective cover 30.

The numerical values of the constituent lenses of the fourth embodiment are indicated in the following Table 7:

TABLE 7

| $r_i$ | $d_i$ | vitreous material |
|---|---|---|
| $r_1 = \infty$ | $d_1 = 1.00$ | synthetic resin |
| $r_2 = 7.650$ | $d_2 = 0.20$ | |
| $r_3 = 1.337$ | $d_3 = 1.60$ | LAH53 |
| $r_4 = 6.486$ | $d_4 = 0.74$ | |
| $r_5 = \infty$ | $d_5 = 0.1$ | polycarbonate |
| image surface = $\infty$ | | |

In the fourth embodiment, the first lens L1 is formed of synthetic resin, so that the objective lens 15 can be reduced in weight. Moreover, since the synthetic resin is less costly than glass, as material, and is superior in workability, the objective lens 15 can be mass-produced at low cost.

Table 8 shows cone constants k and fourth to tenth order aspherical coefficients A to D of the compound surface $S_2$, as the second surface, made up by a diffraction surface $S_{2d}$ and a refractive surface $S_{2r}$, a third surface $S_3$ and a fourth surface $S_4$:

TABLE 8

| | $k(C_1)$ | $A(C_2)$ | $B(C_3)$ | $C(C_4)$ | $D(C_5)$ |
|---|---|---|---|---|---|
| $S_{2d}$ | −3.429E−02 | −6.352E−04 | +4.464E−04 | −4.013E−04 | +8.916E−05 |
| $S_{2r}$ | −1.000 | +1.211E−02 | −8.507E−03 | +7.647E−03 | −1.699E−03 |
| $S_3$ | −0.386 | −0.356E−02 | +0.262E−02 | −0.113E−01 | +0.197E−01 |
| $S_4$ | −16.53 | −0.467E−01 | +0.355 | −1.184 | +1.680 |

Figure 27:
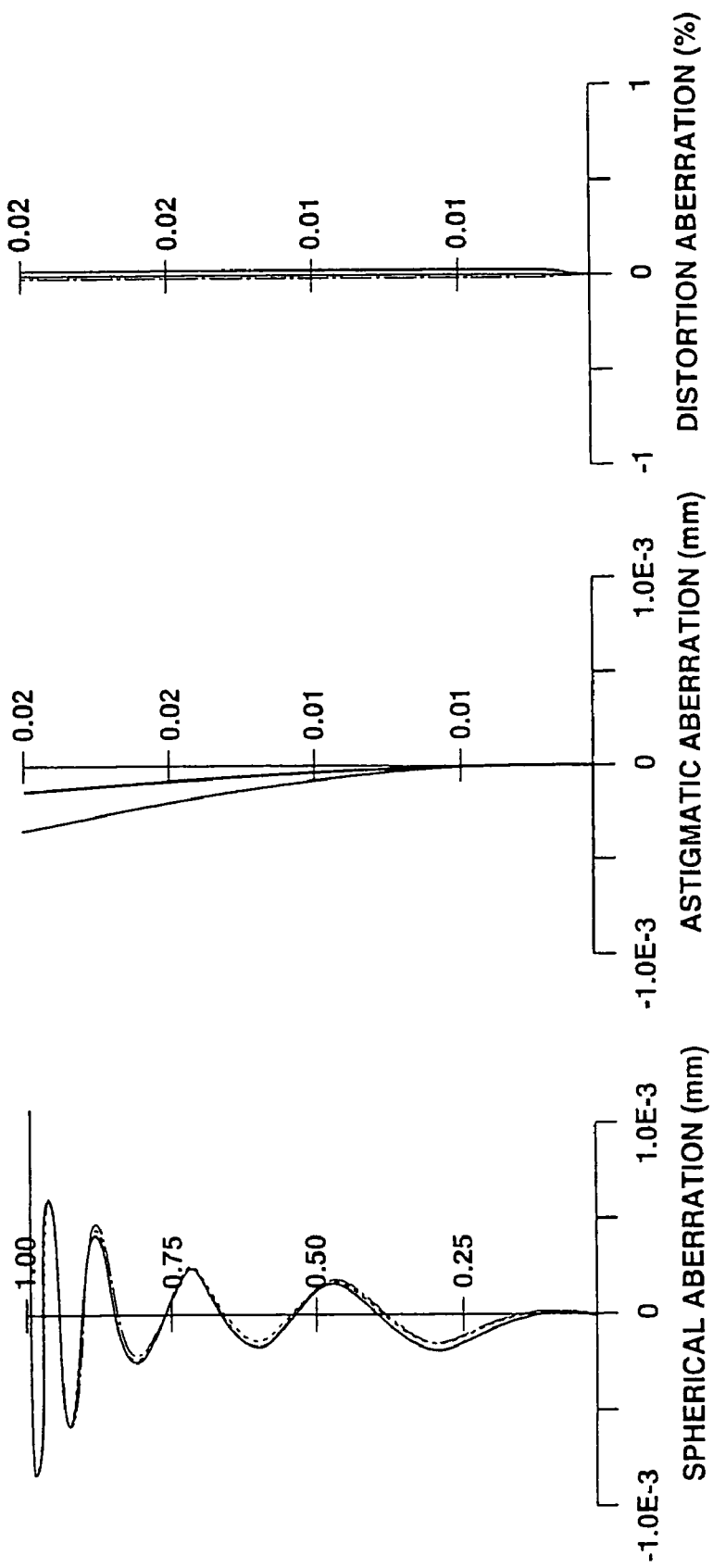
FIG. 27A shows a graph showing spherical aberration of the fourth embodiment of the objective lens.
FIG. 27B is a graph showing astigmatic aberration thereof and FIG. 27C is a graph showing distortion aberration thereof.

FIGS. 27A, 27B and 27C show the spherical aberration, astigmatic aberration and the distortion aberration of the objective lens 15 of the fourth embodiment, respectively. The diffraction reference wavelength, design order number N, design wavelength and the numerical aperture are 405 nm, 10,405 nm and 0.85, respectively.

In the respective aberration diagrams of FIGS. 27A to 27C, the values at the wavelength of 405 nm, indicated by solid lines, those at a wavelength of 403 nm, indicated by broken lines, and those at a wavelength of 407 nm, indicated by chain-dotted lines, substantially overlap one another to render it difficult to discriminate the respective aberrations from one another. This indicates that the objective lens 15 in the fourth embodiment suffers from chromatic aberration only to an extremely small extent. Thus, it may be seen that, in the present fourth embodiment, chromatic aberration of the objective lens 15 has been corrected effectively.

By changing the design of the objective lens to the design employing the diffracted light of the higher order as the objective lens 15 of the fourth embodiment, the height and the width of the staircase shape of the diffraction surface $S_{2d}$ are the order number times those for the first order diffracted light. Thus, in case the width of the staircase shape of the rim portion of the lens is smaller than that of the other lens portion, the designing employing the larger order number is effective from the perspective of workability of the staircase shape of the diffraction surface $S_{2d}$.

Figure 28:
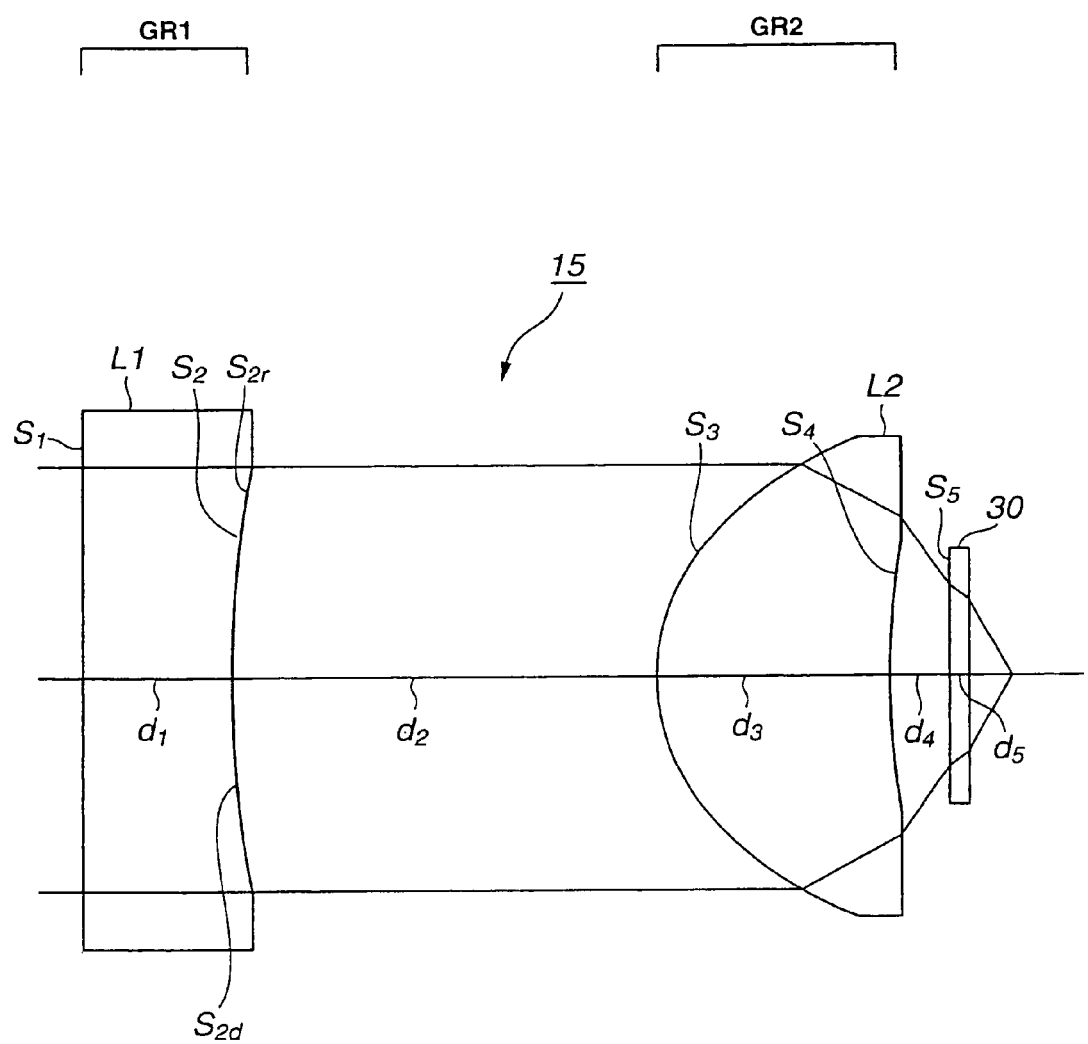
FIG. 28 shows a lens structure of a fifth embodiment of an objective lens for an optical pickup according to the present invention.

FIG. 28 shows the lens structure of the fifth embodiment of the objective lens 15 according to the present invention. Specifically, the first lens L1 is formed of a suitable synthetic resin material, the second lens L2 is formed of LAH53 and the separation between the first lens set GR1 and the second lens set GR2 is set so as to be not less than 1 mm.

The objective lens 15 in the fifth embodiment is comprised of the first lens set GR1, formed by a piano-concave lens, as a first lens L1, formed of a synthetic resin, and having a compound surface $S_2$ comprised of a diffractive surface $S_{2d}$ layered on a refractive surface $S_{2r}$ as a base surface, and a second lens set GR2 formed by a second lens L2, which is a single high-power lense molded of glass so as to have an aspherical surface. Between the second lens L2 and the image surface (recording layer of the optical disc 100) is arranged a polycarbonate protective cover 30.

The numerical values of the constituent lenses of the fifth embodiment are indicated in the following Table 9:

TABLE 9

| $r_i$ | $d_i$ | vitreous material |
|---|---|---|
| $r_1 = \infty$ | $d_1 = 1.00$ | synthetic resin |
| $r_2 = 7.650$ | $d_2 = 3.00$ | |
| $r_3 = 1.337$ | $d_3 = 1.60$ | LAH53 |
| $r_4 = 6.486$ | $d_4 = 0.74$ | |
| $r_5 = \infty$ | $d_5 = 0.1$ | polycarbonate |
| image surface = $\infty$ | | |

In the fifth embodiment, the first lens L1 is formed of synthetic resin, so that the objective lens 15 can be reduced in weight. Moreover, since the synthetic resin is less costly than glass, as material, and is superior in workability, the objective lens 15 can be mass-produced at low cost.

Table 10 shows cone constants k and fourth to tenth order aspherical coefficients A to D of the compound surface $S_2$, as second surface, made up by a diffraction surface $S_{2d}$ and a refractive surface $S_{2r}$, a third surface $S_3$ and a fourth surface $S_4$:

facilitated machining of the phase diffraction grating forming the compound surface $S_2$.

In an objective lens used for an optical pickup, adapted for coping with an optical disc having a high information recording capacity, it is requested to set the chromatic aberration to 0.05 μm/nm or less. In the conventional single type objective lens 201, shown in FIG. 1, the chromatic aberration on the order of ±0.6 μm/nm is produced for wavelength variations of ±2 nm of the laser light, whereas, in each objective lens according to the present invention, described above, the chromatic aberration can be low and on the order of 0.01 μm/nm for wavelength variations on the order of ±2 nm, as conventionally, so that, in the optical pickup and in the optical disc device, information recording and/or reproduction can be achieved in stability and the laser light spot diameter can be diminished to close to the diffraction threshold. As a consequence, the objective lenses of the present invention can be of sufficient performance for coping with the optical disc of such standard in which the information recording density has been raised by narrowing the track pitch.

TABLE 10

|  | $k(C_1)$ | $A(C_2)$ | $B(C_3)$ | $C(C_4)$ | $D(C_5)$ |
|---|---|---|---|---|---|
| $S_{2d}$ | −3.429E−02 | −9.168E−03 | +1.209E−02 | −1.006E−02 | +2.339E−03 |
| $S_{2r}$ | −1.000 | +1.747E−02 | −2.304E−02 | +1.918E−02 | −4.457E−03 |
| $S_3$ | −0.386 | −0.356E−02 | +0.262E−02 | −0.113E−01 | +0.197E−01 |
| $S_4$ | −16.53 | −0.467E−01 | +0.355 | −1.184 | +1.680 |

FIGS. 29A, 29B and 29C show the spherical aberration, astigmatic aberration and the distortion aberration of the objective lens 15 of the fifth embodiment, respectively. The diffraction reference wavelength, design order number N, design wavelength and the numerical aperture are 405 nm, 1,405 nm and 0.85, respectively.

In the respective aberration diagrams of FIGS. 29A to 29C, the values at the wavelength of 405 nm, indicated by solid lines, those at a wavelength of 403 nm, indicated by broken lines, and those at a wavelength of 407 nm, indicated by chain-dotted lines, substantially overlap one another to render it difficult to discriminate the respective aberrations from one another. This indicates that the objective lens 15 in the fifth embodiment suffers from chromatic aberration only to an extremely small extent. Thus, it may be seen that, in the present fifth embodiment, chromatic aberration of the objective lens 15 has been corrected effectively.

Meanwhile, when the objective lens 15 according to the present invention is assembled to the optical pickup 12 and put to use in this state, the objective lens is driven by a biaxial actuator inasmuch as focusing servo and tracking servo need to be applied. On application of the focusing servo and tracking servo, the objective lens 15 tends to be subjected to resonant oscillations.

With the objective lens 15 of the fifth embodiment, the spacing $d_2$ between the first lens set GR1 and the second lens set GR2 is set to 3.0 mm. It should be noted that such designing which will cancel out the resonant oscillations on application of the focusing servo and tracking servo is enabled by adjusting the spacing $d_2$ to shift the position of center of gravity of the objective lens 15, which is the lens combined from the first lens L1 and the second lens L2, to cancel out the resonant oscillations produced on application of the focusing servo and the tracking servo.

As described above, the objective lens 15 according to the present invention is a hybrid double lens set type refraction-diffraction lens comprised of the first lens set GR1 formed by the first lens L1 and the second lens set GR2 formed by the single lens L2 with an aspherical surface. The first lens L1 has the compound surface $S_2$ comprised of the phase diffraction surface $S_{2d}$ formed on the aspherical refraction surface $S_{2r}$. The refractive surface (base surface) $S_{2r}$, to which is added the refractive surface $S_{2d}$, is formed as an aspherical concave surface. This designing allows to set the on-axis chromatic aberration to be approximately equal to zero even if the wavelength of the laser light from the laser light emitting element 16 is changed, so that the working distance may be designed to a larger value to reduce the radius of curvature of the base surface, as the necessary numerical aperture (NA) is maintained, thus providing for By employing the objective lens of the present invention for an optical pickup including means for increasing or varying the laser power for coping with the rewritable optical disc for reducing the laser noise, it is possible to improve the reproducing performance and the recording performance of the high recording density information.

Moreover, by employing the optical pickup 12 employing the objective lens of the present invention, it is possible to furnish an optical disc device having improved recording and/or reproduction performance for the high recording density information.

The particular shape or configuration of respective portions of the embodiments of the present invention has been disclosed in the perspective of illustration and hence the scope of the present invention should be defined only in light of the claims without being construed in a limiting fashion.

INDUSTRIAL APPLICABILITY

With the objective lens and an optical pickup employing the objective lens, according to the present invention, the chromatic aberration for the light beam with a wavelength within not larger than a few nm about 420 nm or less can be effectively corrected to narrow down the spot diameter of the light beam to close to the diffraction threshold, so that, by reducing the track pitch of the recording track, it is possible to cope with standard of the optical recording medium in which the track pitch of the recording track is narrowed to raise the information recording density.

With the optical disc device including the optical pickup employing the objective lens according to the present invention, the information can be recorded to high density on the optical recording medium in association with the optical recording medium which has enabled the high density recording, while the information recorded to high density can be read out from the optical recording medium.

The invention claimed is:
1. An objective lens for an optical pickup, constituted of a first lens set including a diffractive type lens and a second lens set including a refractive type lens set in order from an object side, and having a numerical aperture not less than 0.8, and adapted for correcting the chromatic aberration at an image point on an optical axis for light with a wavelength within several nm about a reference wavelength which is not larger than 420 nm, wherein said first lens set has a compound surface constituted by adding a diffractive surface having a positive refractive power to an aspherical refractive surface having a negative refractive power;

an amount of sag of the aspherical surface of said first lens set having a negative refractive power is described by a polynominal of an even order number with respect to a radius, as the cone coefficient of the aspherical coefficient (k) is set to −1;

an amount of sag of the diffractive surface of the first lens set is described by a polynominal of an even order number with respect to a radius;

the order number of the polynominal of the aspherical surface is equal to the order number of the polynominal of the diffractive surface;

the coefficients of the same order numbers of the polynominal of the sag of the aspherical surface are equated to those of the polynominal of the sag of the diffractive surface in such a manner as to meet the equations:

$k=-1$ $C_1=(N-1)c/2$ $C_2=(N-1)A$ $C_3=(N-1)B$ $C_4=(N-1)C$ $C_5=(N-1)D$ where $C_1$, $C_2$, $C_3$, $C_4$, $C_5$ . . . are coefficients of respective order numbers of the polynominal of said aspherical surface, c/2 is the second order coefficient of the polynominal of said diffractive surface and A, B, C, D, . . . are coefficients of the respective orders of the polynominal of said diffractive surface, N is a refractive index;

the lens forming said second lens set is formed by a single lens including at least one aspherical surface; and an aperture is provided between said first and second lens sets.

2. The objective lens for an optical pickup according to claim 1 wherein the aperture provided between said first and second lens sets is formed by a thin film of e.g., metal provided on the surface of a refractive type lens of the second lens set forming said second lens set.

3. An objective lens for an optical pickup, constituted of a first lens set including a diffractive type lens and a second lens set including a refractive type lens set in order from an object side, and having a numerical aperture not less than 0.8, and adapted for correcting the chromatic aberration at an image point on an optical axis for light with a wavelength within several nm about a reference wavelength which is not larger than 420 nm, wherein said first lens set has a compound surface constituted by adding a diffractive surface having a positive refractive power to an aspherical refractive surface having a negative refractive power;

an amount of sag of the aspherical surface of said first lens set having a negative refractive power is described by a polynominal of an even order number with respect to a radius, as the cone coefficient of the aspherical coefficient (k) is set to −1;

an amount of sag of the diffractive surface of the first lens set is described by a polynominal of an even order number with respect to a radius;

the order number of the polynominal of the aspherical surface is equal to the order number of the polynominal of the diffractive surface;

the coefficients of the same order numbers of the polynominal of the sag of the aspherical surface are equated to those of the polynominal of the sag of the diffractive surface in such a manner as to meet the equations:

$k=-1$ $C_1=(N-1)c/2$ $C_2=(N-1)A$ $C_3=(N-1)B$ $C_4=(N-1)C$ $C_5=(N-1)D$ where $C_1$, $C_2$, $C_3$, $C_4$, $C_5$ . . . are coefficients of respective order numbers of the polynominal of said aspherical surface, c/2 is the second order coefficient of the polynominal of said diffractive surface and A, B, C, D, . . . are coefficients of the respective orders of the polynominal of said diffractive surface, N is a refractive index;

the lens forming said second lens set is formed by a single lens including at least one aspherical surface; and concentric irregularities finer than irregularities of said diffractive surface are formed on the compound surface of said first lens set, said concentric irregularities being of a periodic structure having a period equal to about one half said reference wavelength and having an amplitude equal to approximately one fourth the reference wavelength.

4. An optical pickup comprising a laser light radiating element, radiating the laser light, an objective lens for converging the laser light on a recording layer of an optical recording medium, a light receiving element for receiving the laser light and an optical element for causing the laser light radiated from said laser light radiating element to fall on said objective lens and for causing the laser light reflected by the recording layer of the optical recording medium and transmitted through said objective lens to fall on said light receiving element;

said objective lens is constituted of a first lens set including a diffractive type lens and a second lens set including a refractive type lens set in order from an object side, and having a numerical aperture not less than 0.8, and adapted for correcting the chromatic aberration at an image point on an optical axis for light with a wavelength within several nm about a reference wavelength which is not larger than 420 nm, wherein said first lens set has a compound surface constituted by adding a diffractive surface having a positive refractive power to an aspherical refractive surface having a negative refractive power;

an amount of sag of the aspherical surface of said first lens set having a negative refractive power is described by a polynominal of an even order number with respect to a radius, as the cone coefficient of the aspherical coefficient (k) is set to −1;

an amount of sag of the diffractive surface of the first lens set is described by a polynominal of an even order number with respect to a radius;

the order number of the polynominal of the aspherical surface is equal to the order number of the polynominal of the diffractive surface;

the coefficients of the same order numbers of the polynominal of the sag of the aspherical surface are equated to those of the polynominal of the sag of the diffractive surface in such a manner as to meet the equations:

$k=-1$ $C_1=(N-1)c/2$ $C_2=(N-1)A$ $C_3=(N-1)B$ $C_4=(N-1)C$ $C_5=(N-1)D$ where $C_1$, $C_2$, $C_3$, $C_4$, $C_5$ . . . are coefficients of respective order numbers of the polynominal of said aspherical surface, c/2 is the second order coefficient of the polynominal of said diffractive surface and A, B, C, D, . . . are coefficients of the respective orders of the polynominal of said diffractive surface, N is a refractive index;

the lens forming said second lens set is formed by a single lens including at least one aspherical surface; and an aperture is provided between said first and second lens sets.

5. The optical pickup according to claim 4 wherein concentric irregularities finer than irregularities of said diffractive surface are formed on the compound surface of said first lens set, said concentric irregularities being of a periodic structure having a period equal to about one half said reference wavelength and having an amplitude equal to approximately one fourth the reference wavelength.

6. The optical pickup according to claim 4 wherein the cross-sectional shape of the diffractive surface of said first lens set is a staircase shape having step differences affording phase differences equal to integer multiples of a design wavelength.

7. The optical pickup according to claim 4 wherein the working distance from the trailing lens surface to said image point is not less than 0.5 mm.

8. The optical pickup according to claim 4 wherein respective lenses forming said first and second lens sets are arranged in a common lens barrel.

9. The optical pickup according to claim 4 wherein said first lens set has a surface closest to a light source side as a planar surface and has a refractive power for the design wavelength equal to zero.

10. The optical pickup according to claim 9 wherein the aperture provided between said first and second lens sets is formed by a thin film of e.g., metal provided on the surface of a refractive type lens of the second lens set forming said second lens set.

11. The optical pickup according to claim 4 wherein the lens forming said first lens set is formed of synthetic resin.

12. The optical pickup according to claim 4 wherein a protective cover having a thickness not larger than 0.3 mm is arranged between said second lens set and the image surface and wherein the spherical aberration attributable to said protective cover is corrected.

13. The optical pickup according to claim 4 wherein the lens forming said first lens set and the lens barrel are formed as one from synthetic resin.

14. The optical pickup according to claim 13 wherein a lens forming said second lens set is arranged in said lens barrel formed as one with the lens forming the first lens set.

15. An optical pickup comprising a laser light radiating element, radiating the laser light, an objective lens for converging the laser light on a recording layer of an optical recording medium, a light receiving element for receiving the laser light and an optical element for causing the laser light radiated from said laser light radiating element to fall on said objective lens and for causing the laser light reflected by the recording layer of the optical recording medium and transmitted through said objective lens to fall on said light receiving element;

said objective lens is constituted of a first lens set including a diffractive type lens and a second lens set including a refractive type lens set in order from an object side, and having a numerical aperture not less than 0.8, and adapted for correcting the chromatic aberration at an image point on an optical axis for light with a wavelength within several nm about a reference wavelength which is not larger than 420 nm, wherein said first lens set has a compound surface constituted by adding a diffractive surface having a positive refractive power to an aspherical refractive surface having a negative refractive power;

an amount of sag of the aspherical surface of said first lens set having a negative refractive power is described by a polynominal of an even order number with respect to a radius, as the cone coefficient of the aspherical coefficient (k) is set to −1;

an amount of sag of the diffractive surface of the first lens set is described by a polynominal of an even order number with respect to a radius;

the order number of the polynominal of the aspherical surface is equal to the order number of the polynominal of the diffractive surface;

the coefficients of the same order numbers of the polynominal of the sag of the aspherical surface are equated to those of the polynominal of the sag of the diffractive surface in such a manner as to meet the equations:

$k=-1$ $C_1=(N-1)c/2$ $C_2=(N-1)A$ $C_3=(N-1)B$ $C_4=(N-1)C$ $C_5=(N-1)D$ where $C_1$, $C_2$, $C_3$, $C_4$, $C_5$ . . . are coefficients of respective order numbers of the polynominal of said aspherical surface, c/2 is the second order coefficient of the polynominal of said diffractive surface and A, B, C, D, . . . are coefficients of the respective orders of the polynominal of said diffractive surface, N is a refractive index;

the lens forming said second lens set is formed by a single lens including at least one aspherical surface; and concentric irregularities finer than irregularities of said diffractive surface are formed on the compound surface of said first lens set, said concentric irregularities being of a periodic structure having a period equal to about one half said reference wavelength and having an amplitude equal to approximately one fourth the reference wavelength.

16. The optical pickup according to claim 15 wherein the cross-sectional shape of the diffractive surface of said first lens set is a staircase shape having step differences affording phase differences equal to integer multiples of a design wavelength.

17. The optical pickup according to claim 15 wherein the working distance from the trailing lens surface to said image point is not less than 0.5 mm.

18. The optical pickup according to claim 15 wherein respective lenses forming said first and second lens sets are arranged in a common lens barrel.

19. The optical pickup according to claim 15 wherein an aperture is provided between said first and second lens sets.

20. The optical pickup according to claim 15 wherein said first lens set has a surface closest to a light source side as a planar surface and has a refractive power for the design wavelength equal to zero.

21. The optical pickup according to claim 19 wherein the aperture provided between said first and second lens sets is formed by a thin film of e.g., metal provided on the surface of a refractive type lens of the second lens set forming said second lens set.

22. The optical pickup according to claim 15 wherein the lens forming said first lens set is formed of synthetic resin.

23. The optical pickup according to claim 15 wherein a protective cover having a thickness not larger than 0.3 mm is arranged between said second lens set and the image surface and wherein the spherical aberration attributable to said protective cover is corrected.

24. The optical pickup according to claim 15 wherein the lens forming said first lens set and the lens barrel are formed as one from synthetic resin.

25. The optical pickup according to claim 24 wherein a lens forming said second lens set is arranged in said lens barrel formed as one with the lens forming the first lens set.

26. An optical disc device for recording and/or reproducing the information for recording and/or reproducing the information for a rotating disc-shaped recording medium by an optical pickup movable along the radius of said disc-shaped recording medium;

said optical pickup including a laser light radiating element, radiating the laser light of a wavelength equal to 420 nm or less, an objective lens for converging the laser light on a recording layer of an optical recording medium, a light receiving element for receiving the laser light and an optical element for causing the laser light radiated from said laser light radiating element to fall on said objective lens and for causing the laser light reflected by the recording layer of the optical recording medium and transmitted through said objective lens to fall on said light receiving element;

said objective lens is constituted of a first lens set including a diffractive type lens and a second lens set including a refractive type lens set in order from an object side, and having a numerical aperture not less than 0.8, and adapted for correcting the chromatic aberration at an image point on an optical axis for light with a wavelength within several nm about a reference wavelength which is not larger than 420 nm, wherein said first lens set has a compound surface constituted by adding a diffractive surface having a positive refractive power to an aspherical refractive surface having a negative refractive power;

an amount of sag of the aspherical surface of said first lens set having a negative refractive power is described by a polynominal of an even order number with respect to a radius, as the cone coefficient of the aspherical coefficient (k) is set to −1;

an amount of sag of the diffractive surface of the first lens set is described by a polynominal of an even order number with respect to a radius;

the order number of the polynominal of the aspherical surface is equal to the order number of the polynominal of the diffractive surface;

the coefficients of the same order numbers of the polynominal of the sag of the aspherical surface are equated to those of the polynominal of the sag of the diffractive surface in such a manner as to meet the equations:

$$k=-1$$

$$C_1=(N-1)c/2$$

$$C_2=(N-1)A$$

$$C_3=(N-1)B$$

$$C_4=(N-1)C$$

$$C_5=(N-1)D$$

where $C_1$, $C_2$, $C_3$, $C_4$, $C_5$ . . . are coefficients of respective order numbers of the polynominal of said aspherical surface, c/2 is the second order coefficient of the polynominal of said diffractive surface and A, B, C, D, . . . are coefficients of the respective orders of the polynominal of said diffractive surface, N is a refractive index;

the lens forming said second lens set is formed by a single lens including at least one aspherical surface; and an aperture is provided between said first and second lens sets.

27. An optical disc device for recording and/or reproducing the information for recording and/or reproducing the information for a rotating disc-shaped recording medium by an optical pickup movable along the radius of said disc-shaped recording medium;

said optical pickup including a laser light radiating element, radiating the laser light of a wavelength equal to 420 nm or less, an objective lens for converging the laser light on a recording layer of an optical recording medium, a light receiving element for receiving the laser light and an optical element for causing the laser light radiated from said laser light radiating element to fall on said objective lens and for causing the laser light reflected by the recording layer of the optical recording medium and transmitted through said objective lens to fall on said light receiving element;

said objective lens is constituted of a first lens set including a diffractive type lens and a second lens set including a refractive type lens set in order from an object side, and having a numerical aperture not less than 0.8, and adapted for correcting the chromatic aberration at an image point on an optical axis for light with a wavelength within several nm about a reference wavelength which is not larger than 420 nm, wherein said first lens set has a compound surface constituted by adding a diffractive surface having a positive refractive power to an aspherical refractive surface having a negative refractive power;

an amount of sag of the aspherical surface of said first lens set having a negative refractive power is described by a polynominal of an even order number with respect to a radius, as the cone coefficient of the aspherical coefficient (k) is set to 1;

an amount of sag of the diffractive surface of the first lens set is described by a polynominal of an even order number with respect to a radius;

the order number of the polynominal of the aspherical surface is equal to the order number of the polynominal of the diffractive surface;

the coefficients of the same order numbers of the polynominal of the sag of the aspherical surface are equated to those of the polynominal of the sag of the diffractive surface in such a manner as to meet the equations:

$k=-1$ $C_1=(N-1)c/2$ $C_2=(N-1)A$ $C_3=(N-1)B$ $C_4=(N-1)C$ $C_5=(N-1)D$ where $C_1, C_2, C_3, C_4, C_5 \ldots$ are coefficients of respective order numbers of the polynominal of said aspherical surface, $c/2$ is the second order coefficient of the polynominal of said diffractive surface and A, B, C, D, ... are coefficients of the respective orders of the polynominal of said diffractive surface, N is a refractive index;

the lens forming said second lens set is formed by a single lens including at least one aspherical surface; and concentric irregularities finer than irregularities of said diffractive surface are formed on the compound surface of said first lens set, said concentric irregularities being of a periodic structure having a period equal to about one half said reference wavelength and having an amplitude equal to approximately one fourth the reference wavelength.

* * * * *

UNITED STATES PATENT AND TRADEMARK OFFICE
CERTIFICATE OF CORRECTION

| | | |
|---|---|---|
| PATENT NO. | : 7,050,379 B2 | Page 1 of 1 |
| APPLICATION NO. | : 10/466636 | |
| DATED | : May 23, 2006 | |
| INVENTOR(S) | : Toyokazu Takahashi | |

It is certified that error appears in the above-identified patent and that said Letters Patent is hereby corrected as shown below:

Title Page:
Item (54) and Col. 1, Lines 1-3, should be read as follows:
-- OBJECTIVE LENS FOR PICKUP, OPTICAL PICKUP AND OPTICAL DISC DEVICE --.

Signed and Sealed this

Third Day of July, 2007

JON W. DUDAS
*Director of the United States Patent and Trademark Office*